(12) United States Patent
Snyder et al.

(10) Patent No.: US 11,010,254 B2
(45) Date of Patent: May 18, 2021

(54) SYSTEM AND METHOD FOR PRIORITIZATION OF DATA FILE BACKUPS

(71) Applicant: Cisco Technology, Inc., San Jose, CA (US)

(72) Inventors: Ian Matthew Snyder, San Francisco, CA (US); Nicholas Dye Abalos, San Francisco, CA (US); Peter W. Gleason, Berkeley, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/251,974

(22) Filed: Jan. 18, 2019

(65) Prior Publication Data

US 2019/0179712 A1 Jun. 13, 2019

Related U.S. Application Data

(63) Continuation of application No. 15/834,933, filed on Dec. 7, 2017, now Pat. No. 10,185,628.

(51) Int. Cl.
*G06F 11/14* (2006.01)
*H04N 7/18* (2006.01)
*H04L 29/08* (2006.01)
*H04N 101/00* (2006.01)
(Continued)

(52) U.S. Cl.
CPC ...... *G06F 11/1451* (2013.01); *G06F 11/1464* (2013.01); *H04L 67/1097* (2013.01); *H04N 7/181* (2013.01); *H04N 7/188* (2013.01); *G06F 11/1461* (2013.01); *G06F 11/3058* (2013.01); *G06N 20/00* (2019.01); *H04N 2101/00* (2013.01)

(58) Field of Classification Search
CPC ............ G06F 11/1451; G06F 11/1461; G06F 11/1464; G06F 11/3058; G06N 20/00; H04L 67/1097; H04N 2101/00; H04N 7/181; H04N 7/188
See application file for complete search history.

(56) References Cited

U.S. PATENT DOCUMENTS 7,840,992 B1 * 11/2010 Dufrene .............. G06F 11/1461
726/1
8,583,601 B1 * 11/2013 Claudatos ........... G06F 11/1461
707/654
9,313,455 B1 * 4/2016 Moeeni .................... H04N 7/15
(Continued)

*Primary Examiner* — Amy R Hsu
(74) *Attorney, Agent, or Firm* — Polsinelli PC

(57) ABSTRACT

Systems, methods, and computer-readable media for prioritizing backups of data on cameras. In some examples, a camera records media content items captured by the camera and detects features within respective media content items captured by the camera. The camera tags the media content items with data identifying the features detected within the respective media content items and, based on the data identifying the features detected within the respective media content items, ranks the media content items to yield respective media content item rankings. Based on the respective media content item rankings, the camera selects one or more of the media content items for a prioritized remote backup and, in response to detecting a threat to the camera, sends, according to one or more rules defined for the prioritized remote backup, data associated with the one or more of the media content items to a network destination.

20 Claims, 15 Drawing Sheets

(51) Int. Cl.
*G06N 20/00* (2019.01)
*G06F 11/30* (2006.01)

(56) References Cited

U.S. PATENT DOCUMENTS

| | | | |
|---|---|---|---|
| 9,519,659 B2* | 12/2016 | Jain | G06K 9/00228 |
| 2003/0193395 A1 | 10/2003 | Akisha et al. | |
| 2006/0218439 A1* | 9/2006 | Carter-Schwendler | G06F 21/554 |
| | | | 714/12 |
| 2007/0136541 A1* | 6/2007 | Herz | G06F 11/1466 |
| | | | 711/162 |
| 2008/0224862 A1 | 9/2008 | Cirker | |
| 2009/0245573 A1* | 10/2009 | Saptharishi | H04N 7/181 |
| | | | 382/103 |
| 2010/0231714 A1 | 9/2010 | Flores et al. | |
| 2010/0271199 A1 | 10/2010 | Belov et al. | |
| 2011/0313974 A1* | 12/2011 | Chen | G06F 11/1458 |
| | | | 707/654 |
| 2014/0052694 A1* | 2/2014 | Dasari | G06F 16/23 |
| | | | 707/654 |
| 2014/0085480 A1 | 3/2014 | Saptharishi | |
| 2015/0331905 A1 | 11/2015 | Brand | |
| 2015/0358790 A1 | 12/2015 | Nasserbakht | |
| 2017/0193233 A1 | 7/2017 | Lorini | |
| 2018/0048850 A1 | 2/2018 | Bostick et al. | |
| 2018/0089278 A1 | 3/2018 | Bhattacharjee | |

* cited by examiner

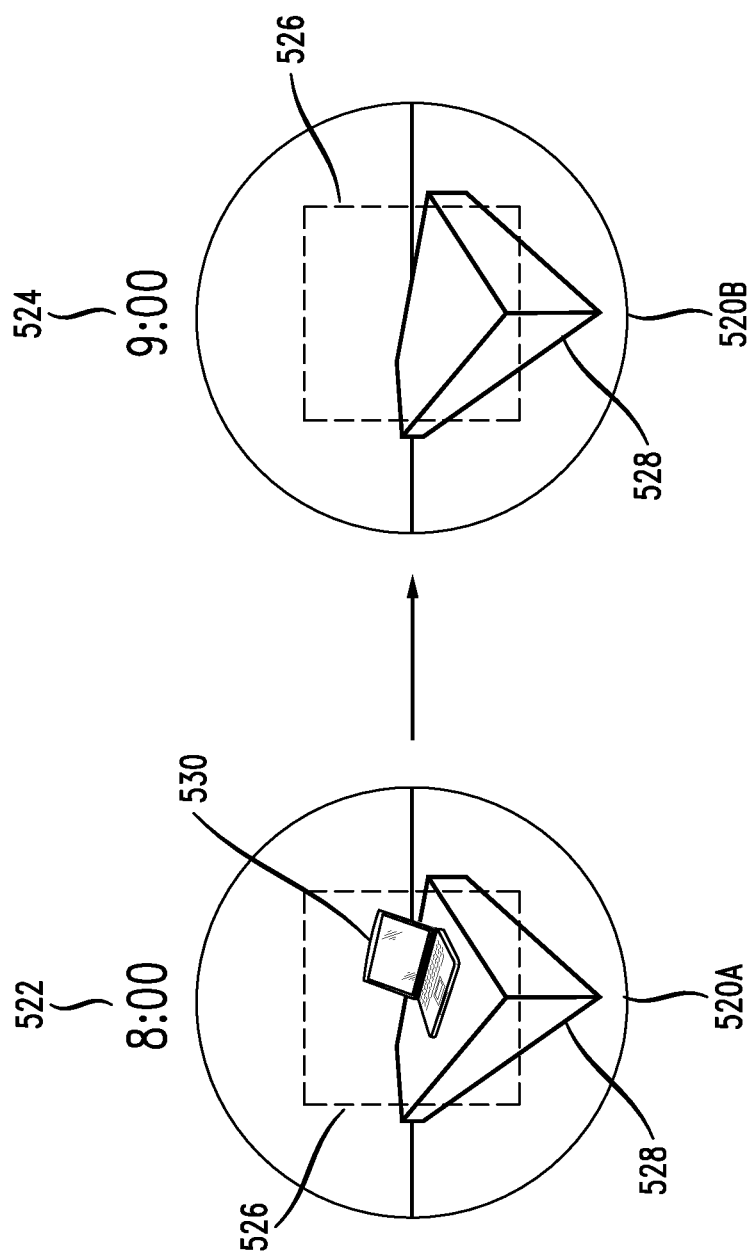

| ID 622 | NAME 624 | TYPE 626 | SIZE 628 | TIMESTAMP 630 | LABELS 632 |
|---|---|---|---|---|---|
| 123 | CONTENT ITEM A | VIDEO | 5 MB | 2017-10-25_04:10:44 | QUALITY, OBJECT A, OBJECT B, EVENT A, HUMAN A, CONDITION B, VIEW A, ACTIVITY B, ATTRIBUTE C |
| 456 | CONTENT ITEM B | VIDEO | 7 MB | 2017-10-24_10:10:20 | OBJECT B, EVENT A, HUMAN A, HUMAN B, VIEW B |
| 789 | CONTENT ITEM C | AUDIO | 1 MB | 2017-10-24_05:05:40 | SOURCE A, HUMAN C, LOCATION B, TOPIC A, ATTRIBUTE B |
| 111 | CONTENT ITEM D | IMAGE | 200 Kb | 2017-10-24_06:05:10 | EVENT A, OBJECT B, ACTIVITY B, VIEW A, SOURCE A |
| ... | ... | ... | ... | ... | ... |
| 222 | CONTENT ITEM N | TEXT | 50 Kb | 2017-10-24_12:12:30 | SOURCE, CONDITION A, EVENT C |

*FIG. 6B*

SYSTEM AND METHOD FOR PRIORITIZATION OF DATA FILE BACKUPS

CROSS-REFERENCE TO RELATED APPLICATIONS

This application is a continuation of U.S. application Ser. No. 15/834,933, filed on Dec. 7, 2017, the content of which is incorporated herein by reference in its entirety.

TECHNICAL FIELD

The present technology pertains to network cameras, and more specifically to prioritizing data backups during events and attacks.

BACKGROUND

Video camera systems can record audio and video in a surrounding area, which users can analyze to monitor and analyze events captured by the recorded audio and video, such as crimes and security events. Captured events in the recorded audio and video can be analyzed in real-time in order to monitor the surrounding area, or at a later time to review the events that transpired in the surrounding area over a period of time. Video camera systems can include networking capabilities to communicate with other devices over the network. The networking capabilities allow users to control the video camera systems over the network and receive the recorded audio and video over the network and remotely monitor the surrounding area or review captured events. Video camera systems can also include audio and video processing capabilities to perform monitoring and detection operations, such as human detection, facial recognition, motion detection, etc. Such processing capabilities allow video camera systems to better monitor and detect specific conditions of interest, human activity and identification, for example. The various recording and processing capabilities of video camera systems make such systems effective tools for deterring crime, protecting humans and property, and investigating events.

Unfortunately, video camera systems are often exposed to the criminal and environmental elements involved in destructive or criminal activity, which is typically of interest to those implementing the video camera systems. Consequently, video camera systems can be susceptible to damage from the criminal and environmental elements responsible for such destructive or criminal activity. For example, criminals may attempt to damage any video camera systems in the area to prevent being captured or identified in a criminal act. Similarly, natural events, such as fires or floods, do not spare video camera systems from their associated destruction. Moreover, it is very difficult to protect video camera systems and their recorded data from damage by criminals or natural events. Yet the recorded data prior to and during such events can be significantly valuable to those attempting to understand and reconstruct these events.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5B illustrates an example diagram for intelligent motion or object detection in video segments;

FIG. 6B illustrates an example index of information about content items on a camera system;

DESCRIPTION OF EXAMPLE EMBODIMENTS

Figure 1:
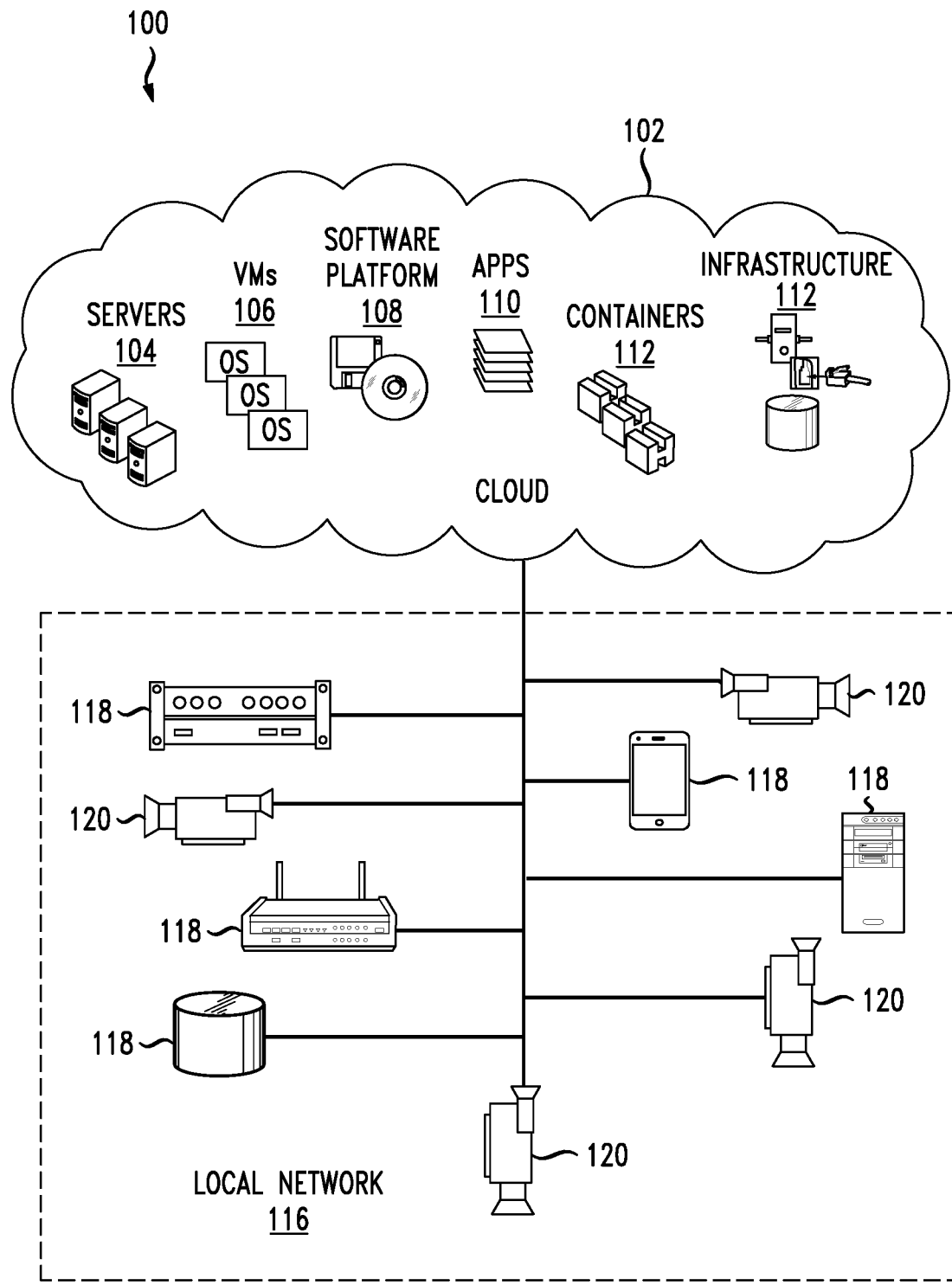
FIG. 1 illustrates an example camera and video management environment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for protecting and backing up critical camera data during physical attacks. In some examples, a camera records media content ibtems (e.g., video, audio, images, sensor data, etc.) captured by the camera, and detects features within respective media content items from the media content items captured by the camera. The features can include, for example, events, objects, conditions, attributes, etc. For example, the features can include humans, human gestures, human emotions, human facial recognition attributes, weapons, vehicles, buildings, conversations, interactions, natural disasters, tampering events, accidents, attacks, emergencies, criminal events, media content, media quality, etc. The camera tags the media content items with data (e.g., tags) identifying the features detected within the respective media content items. For example, the camera can embed tags into a content item identifying an event, object, condition, attribute, description, content quality, timestamp, location, context, etc.

Based on the data identifying the features detected within the respective media content items, the camera ranks the media content items to yield respective media content item rankings. For example, the camera can analyze tags associated with media content items and rank the media content items based on information provided by the tags, such as events, objects, conditions, attributes, etc. Moreover, based on the respective media content item rankings, the camera selects one or more of the media content items for a prioritized remote backup and, in response to detecting a threat to the camera, sends, to a network destination, data associated with the one or more of the media content items. The camera can send the data according to one or more rules defined for the prioritized remote backup. The data can include an entire media content item, a portion of a media content item, a representation of a media content item, a modified version of a media content item, etc. Moreover, the one or more rules can provide instructions for performing a prioritized backup, such as rules for prioritizing items, rules for reducing bandwidth during a backup, rules for sending data during a backup, etc.

DESCRIPTION

As previously mentioned, video camera systems and their associated data can be vulnerable to damage and destruction from criminals and natural events, such as floods or fires. Destruction of the video camera systems and their associated data results in loss of video and data recording such events. However, such video and data can be very valuable to those attempting to reconstruct the events and identify pertinent information.

The disclosed technology addresses the need in the art for effective and intelligent prioritized backups of data recorded by camera systems. The present technology involves system, methods, and computer-readable media for protecting critical data on cameras from damage and prioritizing data backups during an event, such as a physical attack. The disclosed approaches allow data from video camera systems to be backed up and protected before and during such events. Various prediction and detection triggers and factors can be implemented to fast-track backups of camera data to secure locations, to guard against possible camera data destruction. Given the time constraints that are common during such events, the data can be backed up or secured in a prioritized manner. The prioritized backup can also be intelligently adjusted to reduce the bandwidth of the backup, increase the speed of the backup, etc.

For example, camera data can be transmitted to a network location in a prioritized manner which involves transmitting high priority data first and continues with lower priority data until all data has been backed up or damage to the video camera system prevents further transmission of data. Network parameters can also be adjusted to prioritize the network transmission of specific data identified as having higher priority during a backup procedure. Moreover, the types and configurations of data being backed up can also be prioritized and/or adjusted to reduce bandwidth and increase backup performance.

For example, an image of interest can be extracted (e.g., cut) from a frame and backed up prior to attempting to back up the entire frame, data can be backed up at a reduced frame rate, a low bit-rate copy of footage can be backed up prior to attempting a backup of the higher bit-rate copy, content that is not useful due to low quality can be de-prioritized or skipped, a screen shot of a video or frame can be backed up prior to attempting a backup of the video or frame, etc. If time permits after a successful backup of the smaller and/or lower-quality versions of one or more items, the larger and/or higher-quality versions of the one or more items can then be backed up.

A video camera system can implement one or more detection and analysis functions to predict when the video camera system may be at risk of damage that may result in loss of data. A prediction of a risk of damage can trigger the prioritized backup of data. Non-limiting examples of detection and analysis functions can include object detection, human recognition (e.g., facial recognition, emotion recognition, gesture recognition, etc.), event detection, camera tamper detection (e.g., blocking, re-positioning, focus changes, impact sensing, human detection, emotion detection, object-in-hand detection, sound classification, etc.), and so forth. The detection and analysis functions can predict or detect various types of attacks or impacts, such as an impact from a brick, rock, hammer, baseball bat, bullet, etc.

Upon detecting a possible risk of damage, a video camera system can offload the highest priority files to other devices, such as nearby devices on the local network or remote devices via the Internet. In some cases, the destinations for backing up data can be identified or surveyed in advance. The video camera system can alert one or more devices of the detected risk. To facilitate transmission of backup data before or during an event, changes in the network or network parameters, such as quality-of-service (QoS) parameters, can be implemented on the network to prioritize transmission of the backup video files and/or allocate bandwidth to such backups. The content being backed up can also be modified and/or intelligently selected to reduce bandwidth and increase performance. For example, the camera system can reduce or lower the size of data being backed up by trimming a video and sending the trimmed version, taking screen shots of a video and prioritizing backup of the screen shots, reducing frame rates and prioritizing backup at the reduced frame rates, prioritizing low bit-rate copies of content over higher bit-rate copies, etc.

Prioritization schemes for video files can vary based on the specific application or context. For example, an administrator of the video camera system can determine in advance what types of video files or file characteristics should be given highest priority for the particular application associated with the video camera system. Other configurations and/or rules-based prioritization procedures can also be implemented for intelligently determining priorities of backup data. For example, in some cases, default rules may specify that the most recent files and/or files capturing specific events, activities, or motion should be given higher priorities. Such prioritization can result in preservation of as much of the video leading up to the destruction of the camera as possible, which is often the video of highest interest to those examining such events.

FIG. 1 illustrates an example camera and video management environment 100. A local network 116 can include cameras 120 and computing devices 118 configured to communicate with each other over the local network 116. The computing devices 118 can include any network-capable devices, such as laptops, phones, access points, switches, servers, televisions, network storage systems (SANs), tablet computers, kiosks, Internet of things (IoT) devices, etc. The cameras 120 can include one or more types of cameras with networking and data storage capabilities.

The cameras 120 can be setup in various locations to capture and record/store data from their respective locations. The cameras 120 can record video and audio and store the recorded video and audio locally and/or transmit the recorded video and audio to other devices for storage, monitoring, analysis, etc. The cameras 120 can communicate with each other over the local network 116, as well as other devices. For example, the cameras 120 can probe each other for data, conditions, management, etc. As another example, the cameras 120 can communicate with one or more of the devices 118 to transmit recorded data and/or receive management instructions.

The local network 116 can be communicatively coupled to one or more remote networks, which in this example is represented by cloud 102. It should be noted that the one or more remote networks are not limited to cloud networks or environments. The cloud 102 is illustrated herein for clarity and explanation purposes, as other types of networks and network environments are also possible and contemplated herein.

The cameras 120 and devices 118 can communicate with the cloud 102 via the local network 116. In this example, the cloud 102 can include one or more private, public, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure 114. The infrastructure 114 can include various types of nodes and/or hardware, such as compute nodes, storage nodes, network nodes, management systems, etc. In some cases, the infrastructure 114 can include a controller for managing the cameras 120 and/or local network 116.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), function as a service (FaaS), cloud-based management services, and other types of services such as desktop as a service (DaaS), information technology management as a service (ITaaS), managed software as a service (MSaaS), mobile backend as a service (MBaaS), etc.

In some cases, the cameras 120 can communicate with the cloud 102 to backup data to the cloud 120, receive management instructions from the cloud 102, obtain software and/or configuration updates, send or receive alerts, etc. The cloud 102 can also send management instructions to the local network 116 to manage network communications, bandwidth, workloads, and/or parameters, such as quality-of-service (QoS) parameters, class-of-service (CoS) parameters, bandwidth and/or resource allocation instructions, etc., which can be used for prioritization of camera data as further described below.

The cameras 120 and devices 118 can communicate with the cloud 102, including elements 104-114, via one or more public networks (e.g., Internet), private networks, and/or hybrid networks. For example, in some cases, the cameras 120 can communicate with the cloud 102 via a virtual private network (VPN) or tunnel between the cameras 120 on the local network 116 and the cloud 102.

Figure 2:
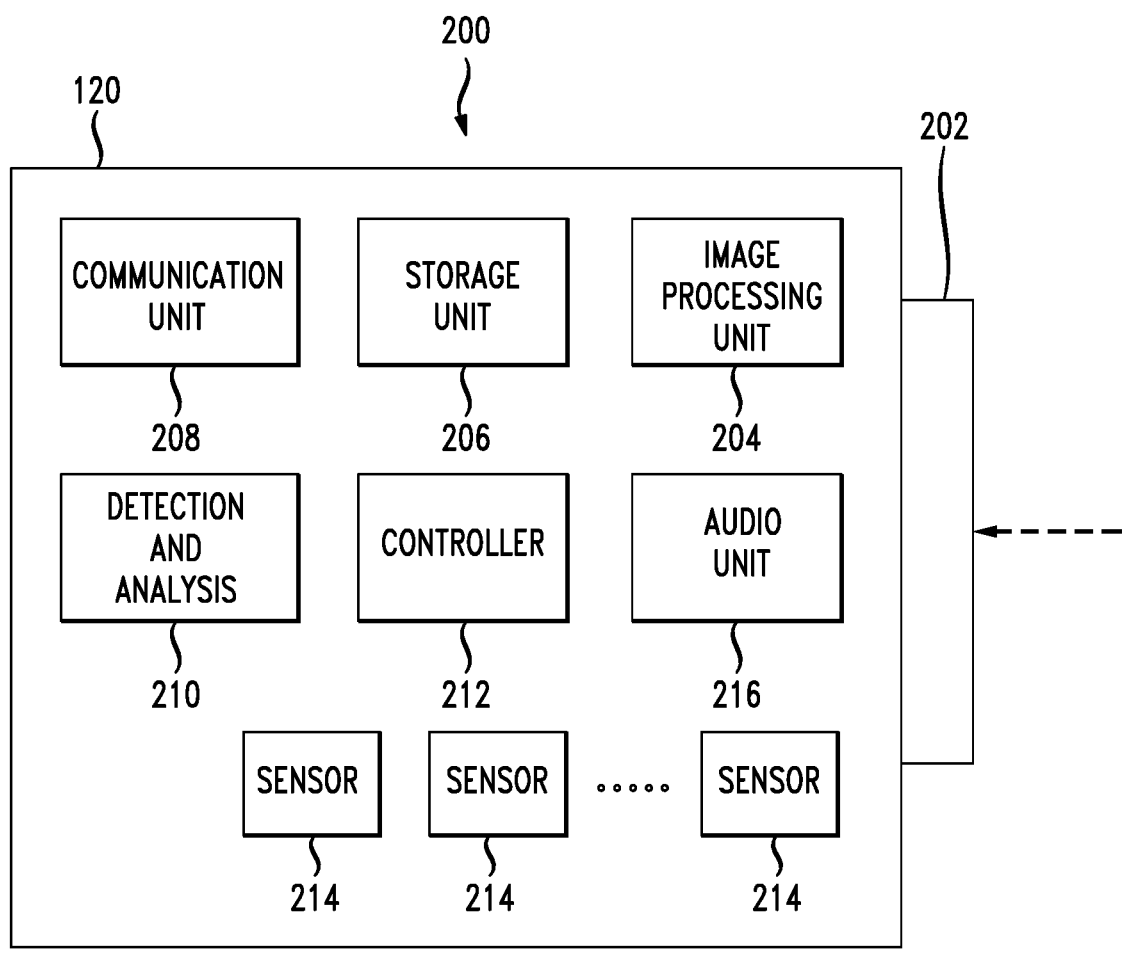
FIG. 2 illustrates an example camera system.

FIG. 2 illustrates an example architecture 200 of an example camera system 120. The architecture 200 can include a lens 202 for capturing video and images. The lens 202 can include an image sensor. In some cases, the lens 202 can include various adjustment parameters, such as tilt, rotation, pan, focus, field of view, etc. The lens 202 can also include other imaging parameters, such as aperture, image quality parameters, zoom parameters, shutter speed, etc.

Image and video data captured by the lens 202 can be provided as input to other components in the camera system 120, such as the image processing unit 204 and the detection and analytics unit 210. Image processing unit 204 can provide one or more image and video processing capabilities based on the input from the lens 202. For example, the image processing unit 204 can process input signals to generate frames of pixels and process the frames to enhance the image content. The image processing unit 204 can also perform other image and video processing capabilities such as, for example, video encoding/decoding, filtering, pixel correction, enhancement, focusing, brightness adjustment, resolution adjustment, trimming, etc.

The architecture 200 can include sensors 214 for detecting various signals and conditions, such as image sensors, motion sensors, noise sensors, light sensors, CMOS sensors, flame detection sensors, proximity sensors, biosensors, machine vision sensors, video sensors, smart scene sensors, tracking sensors, speech recognition sensors, multimodal sensors, hall effect sensors, speed sensors, smoke sensors, metal detector sensors, explosive detection sensors, impact sensors, shock sensors, pressure sensors, moisture sensors, heat sensors, position sensors, tilt sensors, air flow sensors, chemical sensors, gyroscopes, accelerometers, etc. The sensors 214 can include hardware and/or software sensors, as well as other components such as processors, memory, etc.

The architecture 200 can also include one or more audio units 216. The audio units 216 can include audio speakers, microphones, audio signal processing elements, etc. The audio units 216 can capture and detect sound, and determine sound characteristics, such as source, localization, intensity, timing cues, spectral cues, patterns, etc. For example, the audio units 216 can include one or more microphones to detect audio and can include logic to recognize the audio (e.g., human, environmental, etc.), recognize the level or intensity of the audio, identify the location or origin of the audio, identify the direction and distance of the audio, recognize speech, recognize specific types of sounds, etc.

Data calculated or collected from the sensors 214 and audio unit 216 can be provided to the detection and analysis unit 210, which can implement such data along with image and/or video data to detect specific characteristics or conditions in the content of any of the captured data, detect objects and events, and perform other detection operations.

For example, the detection and analysis unit 210 can analyze various aspects of the captured data, such as pixels, frames, sound, images, frame sequences, sensor data, etc., to perform detection operations. Non-limiting examples of detection operations can include tamper detection, blocking (i.e., blocking of the lens 202), re-positioning (i.e., camera and our lens re-positioning), focus changes, impact detection, human detection (e.g., facial recognition), emotion detection, object-in-hand detection, sound classification, label detection, shot change detection, video segmentation, object recognition, motion detection, event detection, lighting detection, smart scene detection, smoke detection, etc.

The storage unit 206 can include one or more storage or memory devices for storing captured data, such as video and image data recorded by the camera system 120, metadata associated with the recorded data, sensor data, recognition data, etc. The storage unit 206 can include one or more solid state storage devices, disk storage devices, and/or any type of storage or memory devices.

The communications unit 208 can include one or more network interfaces for communicating with other devices over a network, such as local network 116. The communications unit 208 can include wireless and/or wired network interfaces. For example, in some cases, the communications unit 208 can include a wireless network interface card for communicating with other devices via a wireless network (e.g., WIFI). The camera system 120 can send and receive data to and from network devices via the communications unit 208.

The controller 212 can include rules, policies, logic, instructions, etc., to manage backup operations of data in the storage unit 206. The backup operations can include prioritizing data to be backed up from the storage unit 206, triggering the backup operations based on one or more factors (e.g., damage risk factors or levels), timing of the backup operations, selection of backup destinations, reduction of bandwidth use by backups, managing communications and backup operations, etc. The controller 212 can process the storage data, detected conditions, stored rules and settings, and other factors to determine when to backup data, which data to backup, where to backup the data, how to prioritize the transmission of data, when to trigger a backup, how to deliver backup data, how to format backup data for delivery, how to reduce bandwidth for a backup and/or increase performance of the backup, etc. The controller 212 can also include rules or instructions for communicating with other devices as part of a determination for when to trigger a backup, where to transmit data in a backup, etc., as further described below. The controller 212 can also coordinate with the network and other devices the backup of the data and the network parameters for transmitting data being backed up. In some cases, the controller 212 can request or exchange data from other network devices or information sources to use in assessing threats, identifying data of interest, determining what data to backup, determining where to backup data, etc.

The components in architecture 200 described herein are non-limiting examples provided for clarity and explanation purposes. It should be noted that other configurations can include more or less components, including components that are not illustrated in architecture 200 but would be recognized by one of skill in the art.

Figure 3:
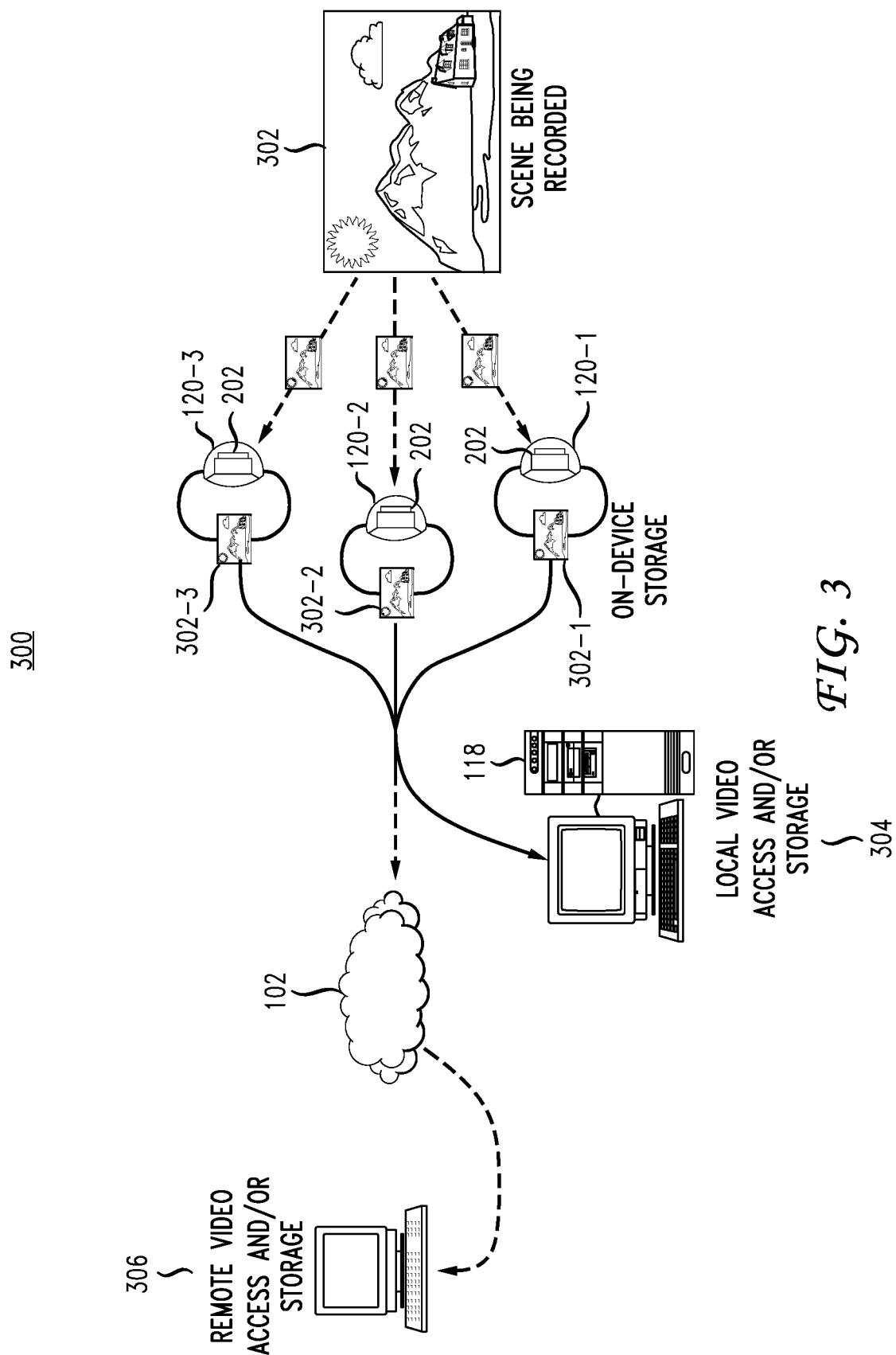
FIG. 3 illustrates an example diagram for capturing and monitoring video in an example video camera environment.

FIG. 3 illustrates an example diagram 300 for capturing and monitoring video in an example video camera environment, such as camera management environment 100. In this example, camera systems 120-1, 120-2, 120-3 are capturing and recording a scene 302 via their respective lenses 202. Depending on their respective field of views and positions, the scene 302 captured by the camera systems 120-1, 120-2, 120-3 can be the same scene, different respective scenes, or different views (e.g., angles, perspectives, positions, etc.) of the same scene. For example, the scene 302 can be the same scene captured from different perspectives by the camera systems 120-1, 120-2, 120-3 based on one or more factors associated with the camera systems 120-1, 120-2, 120-3, such as respective positions or locations, respective angles, respective proximities, respective camera settings, etc. For explanation purposes, the examples below will describe the scene 302 as the same scene captured by the camera systems 120-1, 120-2, 120-3 from their respective perspectives.

The camera systems 120-1, 120-2, 120-3 can capture the scene 302 and store respective recorded data 302-1, 302-2, 302-3 locally at the camera systems 120-1, 120-2, 120-3 (e.g., storage unit 206). The recorded data 302-1, 302-2, 302-3 can include raw and/or processed image or video data, such as pixels and frames; metadata, such as timestamps, tags, classification information, labels, file or content descriptions, file information, frame information, titles, etc.; sensor data captured by the camera systems 120-1, 120-2, 120-3 as part of the recording; etc.

The camera systems 120-1, 120-2, 120-3 can store the recorded data 302-1, 302-2, 302-3 locally on their respective storage (e.g., storage units 206) as previously mentioned, and/or transmit the recorded data 302-1, 302-2, 302-3 to one or more locations, such as nodes 118 and/or cloud 102. For example, the camera systems 120-1, 120-2, 120-3 can transmit the recorded data 302-1, 302-2, 302-3 to a node 118 on the local network 116 for local storage or display 304 at the node 118, and/or to cloud 102 for remote storage or display 306 at cloud 102.

In some cases, the camera systems 120-1, 120-2, 120-3 can transmit the recorded data 302-1, 302-2, 302-3 to node 118 and/or cloud 102 as a video feed for local display at the node 118 and/or remote display at cloud 102. The cloud 102 can also receive such a video feed and provide the video feed for access (e.g., display) by other devices over a network, such as the Internet. For example, the cloud 102 can receive the video feed and allow other devices to stream the video feed from the cloud 102 for presentation at the devices. Thus, users can access the video feed on the cloud 102 from any device and monitor the scene 302 being recorded by the camera systems 102-1, 120-2, 120-3.

Figure 4A:
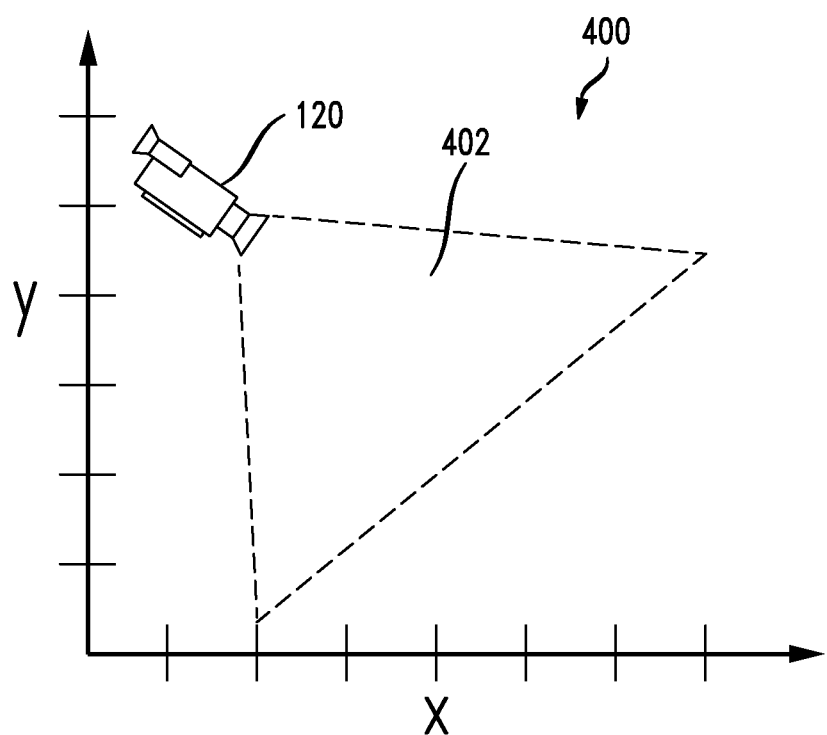
FIG. 4A illustrates an example diagram of a field of view of a camera.

FIG. 4A illustrates an example diagram 400 of a field of view 402 of a camera 120. The field of view 402 illustrates how much of a scene can be seen or captured by the camera 120. The field of view 402 can include a view depth, width, angle, height, etc. The field of view 402 can depend on various factors, such as the angle of the camera, the lens of the camera, the aperture of the camera, the focus of the camera, the zoom settings of the camera, etc.

For example, a narrow field of view may result when the camera is zoomed in, and may only show a small part of a scene (e.g., the door entrance to a room). On the other hand, a wide field of view may result when the camera is zoomed out, and may show a larger part of the scene (e.g., the entire room in addition to the door entrance).

Figure 4B:
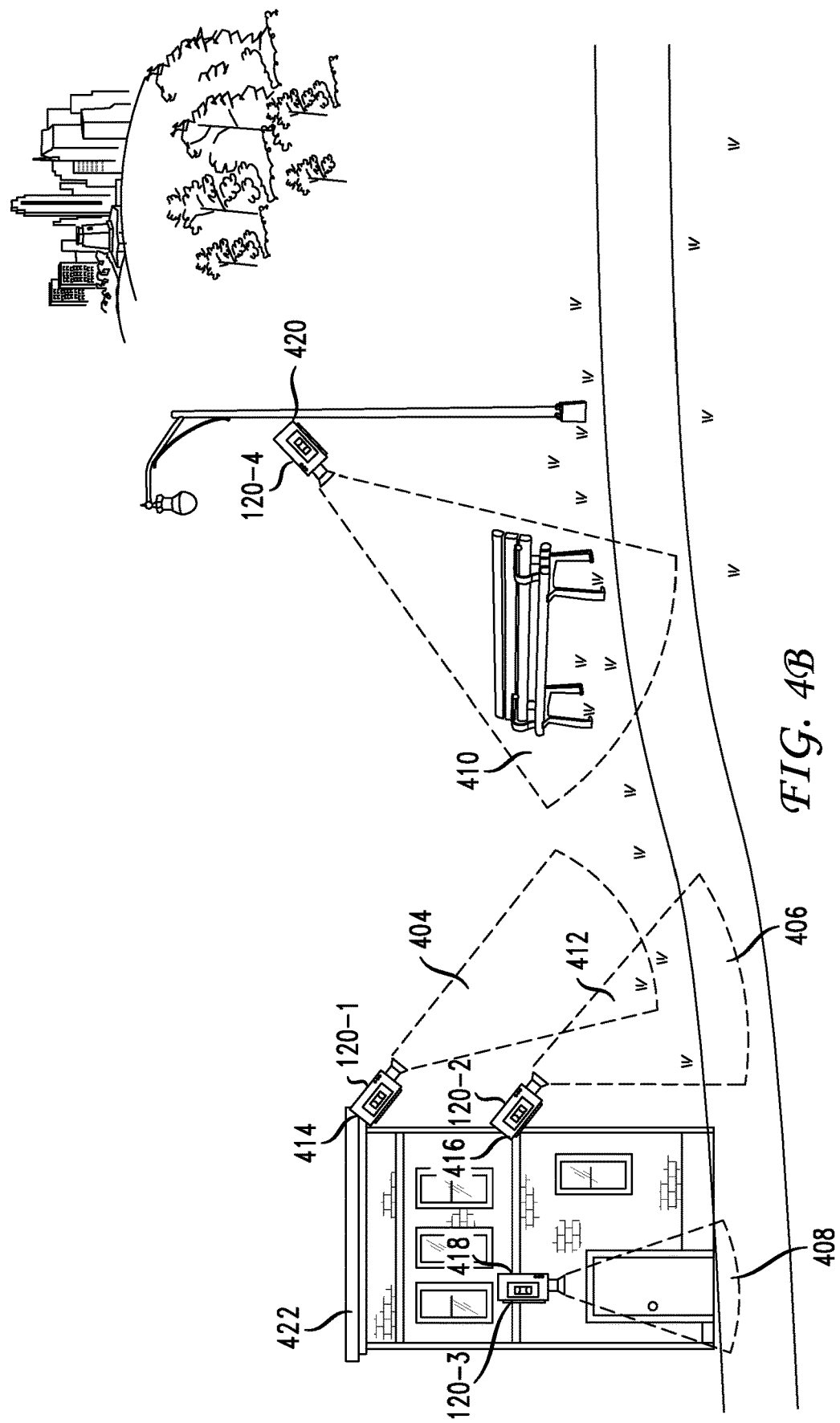
FIG. 4B illustrates an example placement of cameras at a particular site.

FIG. 4B illustrates an example placement of cameras in a particular site. In this example, camera systems 120-1, 120-2, 120-3, 120-4 are positioned on different locations 414, 416, 418, 420 in a site to capture different scenes or views at the site. For example, camera system 120-1 is located at a second floor location 414 of a building 422, which allows the camera system 120-1 to capture and record video within the field of view 404 of the camera system 120-1 from the second floor location 414.

Camera system 120-2 is located at first floor location 416 on a side of the building 422, which allows the camera system 120-2 to capture and record video within the field of view 406 of the camera system 120-2 from the first floor location 416.

Camera system 120-3 is located on a front door location 418 of the building 422, which allows the camera system 120-3 to capture and record video within the field of view 408 of the camera system 120-3 from the front door location 418.

Camera system 102-4 is located on a light post location 420 which allows the camera system 120-4 to capture and record video within the field of view 410 of the camera system 120-4 from the light post location 420.

As illustrated, camera systems 120-1, 120-2, 120-3, 120-4 can capture different views, angles, areas, objects, etc., of a site based on their respective locations 414, 416, 418, 420 and field of views 404, 406, 408, 410. In some configurations, the field of view of two or more camera systems may overlap. For example, field of view 404 of camera system 120-1 can overlap with field of view 406 of camera system 120-2 to yield an overlapping area of coverage 412. The overlapping area of coverage 412 can be useful to capture different angles and perspectives of the same area.

The overlapping area of coverage 412 can also allow the camera systems to capture and record multiple copies of video pertaining to the overlapping area of coverage 412. Thus, if the video recording from one camera system is damaged or deleted, the user may still have a copy of video recorded for the overlapping area of coverage 412 based on the video recording from the second camera.

Because the field of views 404 and 406 of camera systems 120-1 and 120-2 provide an overlapping area of coverage 412, both camera systems 120-1 and 120-2 can detect conditions, events, objects, threats, etc., that take place within the overlapping area of coverage 412. Thus, when detecting a condition, event, object, threat, etc., pertaining to the overlapping area of coverage 412, the camera systems 120-1 and 120-2 can communicate with each other to verify, enhance, or compare detection results. The different angles and/or perspectives provided by the camera systems 120-1 and 120-2 can help when performing a detection operation pertaining to the overlapping area of coverage 412.

For example, camera system 120-1 may detect a human within the overlapping area of coverage 412. However, given the position 414 and/or field of view 404 of the camera system 120-1, the human detection result may be assigned a low probability, suggesting a level of uncertainty by the camera system 120-1. Given the low probability, the camera system 120-1 may communicate with camera system 120-2 to verify its human detection result. If camera system 120-2 also detects the human after performing a human detection operation, the camera system 120-1 can obtain added certainty or verification for its human detection results. If the human detection result of camera system 120-2 has a high probability, camera system 120-1 can significantly increase the likelihood that the human detection result obtained by camera system 120-1 is indeed correct.

As previously mentioned, the camera systems 120-1 and 120-2 can also compare their detection results to obtain an enhanced detection based on the combination of detection results. For example, if one camera system detects x number of attributes for an object or view of the overlapping area of coverage 412 and another camera system detects y number of attributes for the object or view, the camera systems can combine their captured data to enhance their detection results and increase the number of attributes detected for the object or view.

As illustrated in this example, multiple camera systems can be configured to overlap coverage in certain areas, such as high incident or value areas, and/or maximize the overall coverage at the site. Overlapping coverage can be used to obtain backup or multiple recordings, and perform cross-checking and verification of capture and detection results. Data captured for non-overlapping areas can also be combined to provide a greater overall view or depiction of a site and/or detection results for one or more areas in the site. For example, one camera system may capture a criminal event from a human, while another camera may capture the event(s) leading up to the criminal event. To illustrate, one camera system may capture the crime and another camera system may capture a fleeing direction of the criminal. The data captured, and intelligence ascertained, from the non-overlapping areas of coverage of the two camera systems can be combined to enhance the overall understanding of the event and/or detection operations associated with the event.

For example, the field of view 408 of camera system 120-3 and field of view 406 of camera system 120-2 can provide more complete coverage of a particular area around the front of the building 422. The captured feeds from camera systems 120-2 and 120-3 for views 406 and 408 can be combined to provide coverage for a larger area over a period of time. To illustrate, assume there is a burglary at building 422 with a forced entry through the front door of the building 422, which is within view 408. Camera system 120-3 can capture the forced entry through the front door based on the recordings of view 408 at the time of the forced entry. Assume camera system 120-2 also captured the perpetrator prior to the forced entry within view 406. The recordings of view 406 from camera system 120-2 can thus capture the perpetrator and events leading up to the forced entry. Accordingly, the recordings of view 406 from camera system 120-2 can be combined with the recordings of view 408 from camera system 120-3 to obtain a more complete understanding of the forced entry event, the perpetrator, and the events leading up to the forced entry.

Figure 5A:
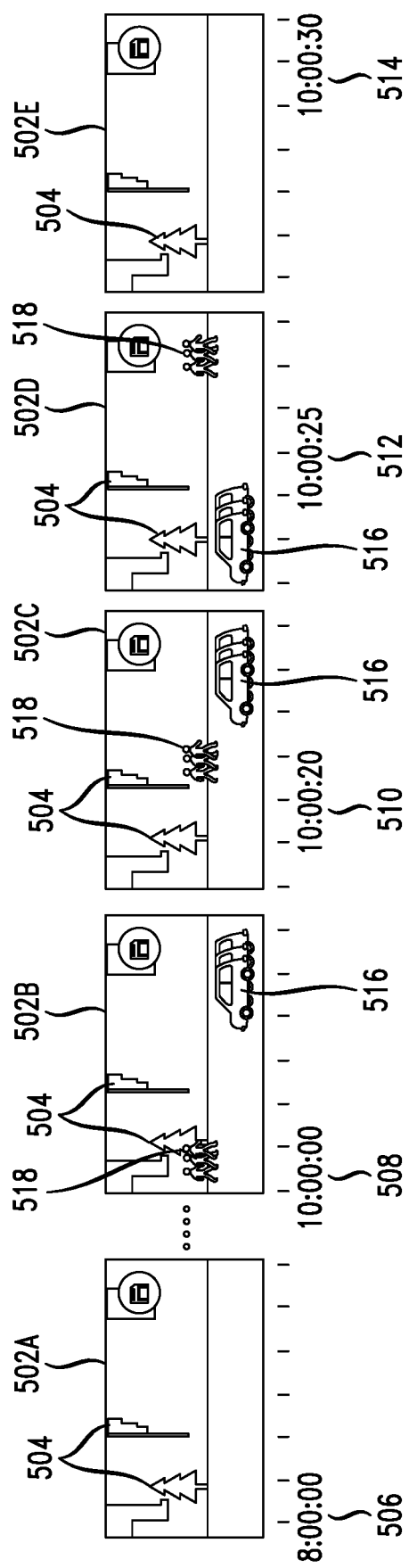
FIG. 5A illustrates example video recording frames capturing a scene recorded at various times.

FIG. 5A illustrates example video recording frames 502A-E capturing a scene recorded at various times 506, 508, 510, 512, 514. Frame 502A illustrates the scene recorded at a first time 506, which is 8:00:00 in this example. Frame 502A captures static objects 504 at the scene, with no events or moving objects detected in the frame 502A.

Frame 502B illustrates the scene recorded at a second time 508, which is 10:00:15 in this example. Frame 502B therefore captures the scene two hours and fifteen seconds after frame 502A. Like frame 502A, frame 502B also captures the static objects 504. However, in addition, frame 502B also captures a human 518 and car 516. The human 518 and car 516 in frame 502B are moving towards each other.

Frame 502C illustrates the scene recorded at a third time 510, which is 10:00:20 in this example. Frame 502C therefore captures the scene five seconds after frame 502B. Like frames 502A and 502B, frame 502C also captures the static objects 504. Frame 502C also captures the human 518 and car 516 moving towards each other. However, in frame 502C, the human 518 and car 516 appear closer to each other than in frame 502B. Thus, frames 502B and 502C indicate that the human 518 and car 516 moved closer towards each other during the five seconds between frames 502B and 502C.

Frame 502D illustrates the scene recorded at a fourth time 512, which is 10:00:25 in this example. Frame 502D therefore captures the scene five seconds after frame 502C and ten seconds after frame 502B. Like frames 502A, 502B, and 502C, frame 502D also captures the static objects 504. Frame 502D also captures the human 518 and car 516. However, in frame 502D, the human 518 and car 516 appear to have moved past each other. Thus, frames 502C and 502D indicate that the human 518 was in front of the car 516 at 10:00:25, the human 518 and car 516 were moving toward each other and actually passed each other during the five seconds between frames 502C and 502D.

Finally, frame 502E illustrates the scene recorded at a fifth time 514, which is 10:00:30 in this example. Frame 502E therefore captures the scene five seconds after frame 502D, ten seconds after frame 502C, and fifteen seconds after frame 502B. Like frame 502A, frame 502E captures the static objects 504 but no events or moving objects.

When analyzed, frames 502A-E can depict an event involving the human 518 and the car 516 at specific times associated with the frames 502A-E. The frames 50A-E illustrate that the human 518 and car 516 had not crossed each other at 8:00:00, were initially captured at the scene moving towards each other at 10:00:15 in frame 502B, passed each other after ten seconds of moving toward each other, and were no longer within the scene by 10:00:30. If a user wants to review or identify an interaction between the human 518 and the car 516, the user would be able to focus on frames 502B-D which would capture the moment of the interaction as well as the moments before and after the interaction.

If a camera system needs to perform a backup of frames at the camera system, the camera system can prioritize backup of frames which capture activities or events, which in this example are frames 502B-D, as they have a higher likelihood of being of interest, and assign lower priorities to those frames which do not capture any activities or events, which in this example are frames 502A and 502E.

In some cases, the camera system may further prioritize the frames 502B-D based on additional factors or conditions associated with the activities or events captured by those frames. For example, when backing up frames associated with an event between the human 518 and car 516, the camera system can prioritize frames 502C and 502D over frame 502B, as frames 502C and 502D capture the moments closest in time to when the human 518 and car 516 crossed each other, which would have the highest likelihood of capturing the interaction between the human 518 and car 516. Once the camera system has completed backing up frames 502C and 502D, the camera system may then continue with a backup of frame 502B, which can be assigned a second-highest priority as it captures the human 518 and car 516 within the scene, albeit at an earlier moment. Finally, if the camera system completes backing up frame 502B and has additional time and space for additional backup of the remaining frames, the camera system can then backup frames 502A and 502E, which are designated a lowest priority and thus backed up last.

In a scenario where the camera system captures an event and determines that the camera system is at risk of damage from a threat associated with the event (e.g., such as a vandalism threat or a natural threat from a fire), the camera may not have enough time to perform a backup of all its captured data before becoming damaged by the source of the threat. In such cases, the prioritized backup of frames can allow the camera system to backup the most important or relevant frames prior to any damage. Once the backup has completed for the most important or relevant frames, any loss of data resulting from damage to the camera by the source of the threat may not be as significant, as it may not prevent the camera system from backing up the frames which capture the event and/or moments leading up to the event.

Given the time constraints in some scenarios prior to an attack, the camera system can also make adjustments to reduce the amount of bandwidth used by a backup and increase the backup speed or performance. For example, instead of sending the entire frame 502C to a backup destination during an incident (e.g., an attack), the camera system can instead take a screenshot of frame 502C and backup the screenshot, or crop an image from frame 502C down to an area of interest, such as the area around the human 518 and car 516, and backup the cropped image. The screenshot or cropped image examples can allow the camera system to backup a portion of interest from frame 502C at a reduced bandwidth and faster speed. This can increase the likelihood that the data backed up within the limited time before the camera system is damaged provides adequate information about the incident or events of interest. If the camera system has time for additional backups after it has completed backing up the screenshot or cropped image and any other high priority data, the camera system can later attempt to backup the full frame 502C if time permits. However, the backup of the full frame 502C may not be as urgent once a representative portion of interest (e.g., screenshot or cropped image) has been backed up and can provide information about the incident or event without the full frame 502C.

As another example, the camera system can reduce the frame rate or bit-rate of frame 502C and backup the copy of frame 502C at the reduced frame rate or bit-rate instead of, or prior to, backing up the full frame 502C. For example, the camera system can backup a copy of frame 502C having a reduced frame rate or bit-rate instead of the full frame 502C, in order to reduce the bandwidth required to backup the information of interest from frame 502C and increase the speed of the backup, as the lower frame rate or bit-rate copy will be smaller in size than the full frame 502. This can increase the likelihood of successfully backing up the information of interest from frame 502C within the limited time prior to damage to the camera system. If time permits, the camera system can later attempt to backup the full frame 502C.

FIG. 5B illustrates an example diagram for intelligent motion or object detection in video segments. Here, video segment 520A and video segment 520B capture a scene recorded at a first time 522 and a second time 524, respectively 8:00 and 9:00, when a laptop computer 530 went missing. Video segment 520A depicts the laptop computer 530 on a desk 528 at the first time 522, and video segment 520B depicts the desk 528 without the laptop computer 530 at the second time 524. A camera system 120 can analyze an area 526 of interest within the scene captured by video segments 520A and 520B to detect the event causing the laptop computer 530 to go missing.

The camera system 120 can analyze multiple video segments capturing the area 526 of interest within the scene and zero-in on a particular event captured by video segments 520A and 520B. The camera system 120 can then prioritize video segments 520A and 520B as the highest priority segments associated with that particular event. The camera system 120 can tag, label, or otherwise associate the video segments 520A and 520B with a high priority for that particular event.

If the camera system 120 predicts a risk of damage and data loss, it can initiate a prioritized data backup which prioritizes backup and transmission of the video segments 520A and 520B over other video segments. The camera system 120 can perform a similar prioritization of other video segments to ensure the highest priority video segments are backed up first when there is a threat of damage. The camera system 120 can prioritize the overall video segments having the highest priority for one or more events detected by the camera system 120. In some cases, the camera system 120 can further prioritize high priority video segments for multiple events. For example, the camera system can store two video segments marked as high priority and associated with two different events. The camera system may further prioritize the two video segments to assign one segment a higher priority than the other based on one or more factors, such as event characteristics, quality, time of events, etc. For example, the camera system can prioritize video segments associated with the event perceived to create the risk of damage to the camera that triggered the backup, such as a current event detected and determined to create a risk of damage. As another example, the camera system can prioritize newer video segments from older video segments.

The camera system can then use the prioritization information to perform a prioritized backup triggered by a threat of damage. The prioritized backup can have multiple levels of prioritization, with multiple priorities assigned to different sets and various backup iterations performed according to the multiple levels of prioritization. The camera system can also use various strategies, as further elaborated below, to reduce the bandwidth needed for the backup and increase the speed of backup, in order to increase and optimize the information backed up within a limited period of time.

Figure 6A:
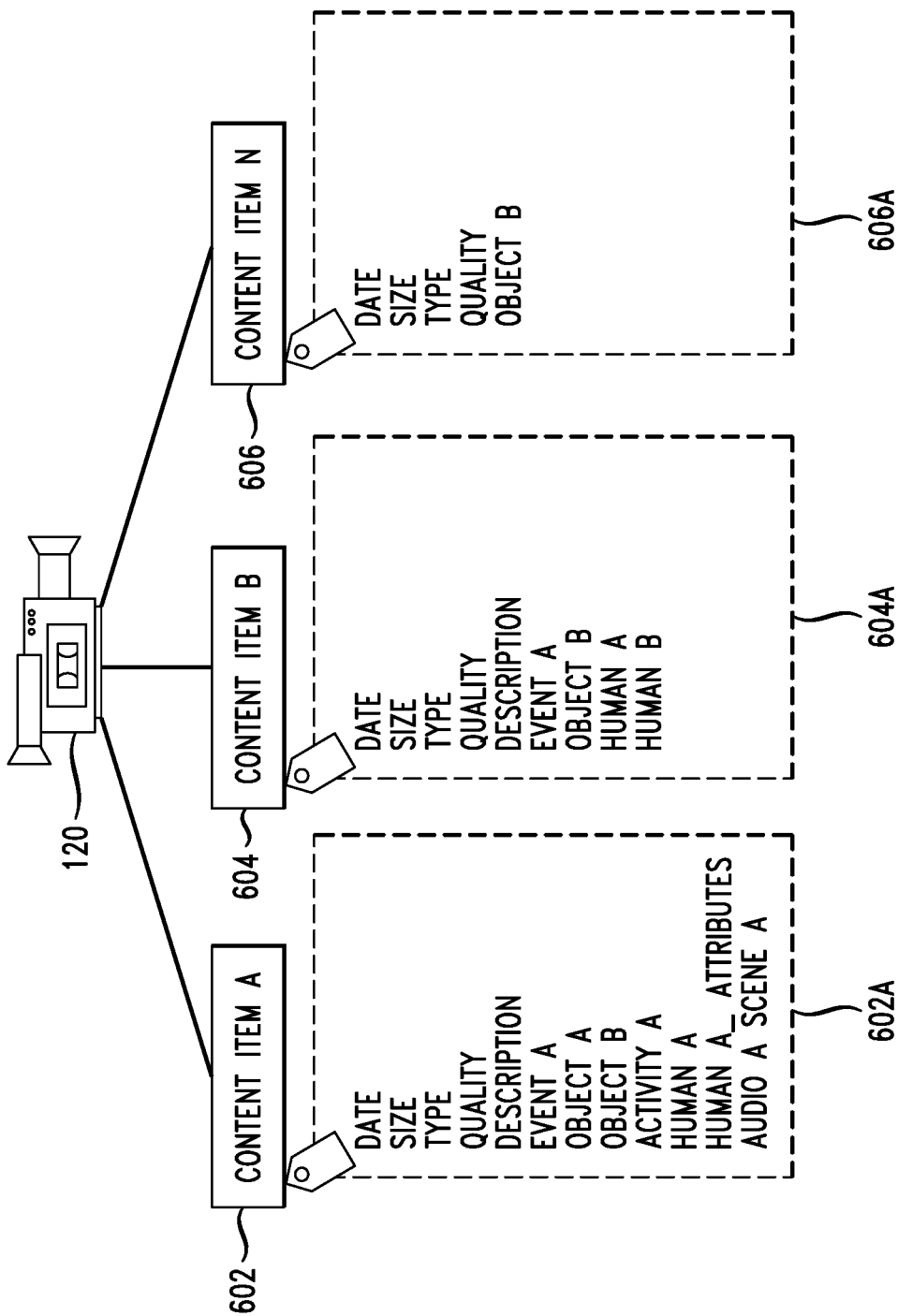
FIG. 6A illustrates example content items on a camera system tagged with information about the content items.

To aid in prioritizing data, the camera system can tag and/or index content stored on the camera system, as shown in FIGS. 6A and 6B, to provide additional information about the stored content which can be used for prioritization.

FIG. 6A illustrates example content items on camera system 120 tagged with information about the content items, which can be used for prioritizing the content items. In this example, content item A (602), content item B (604), and content item N (606) are content items stored at camera system 120. The content items 602, 604, 606 can include content recorded by camera system 120, such as video, audio, images, etc. The content items 602, 604, 606 can also include data captured from sensors (e.g., sensors 214) associated with camera system 120, such as image sensors, motion sensors, noise sensors, light sensors, proximity sensors, biosensors, machine vision sensors, video sensors, smart scene sensors, tracking sensors, speech recognition sensors, hall effect sensors, speed sensors, smoke sensors, metal detector sensors, explosive detection sensors, impact sensors, pressure sensors, moisture sensors, heat sensors, position sensors, air flow sensors, chemical sensors, gyroscopes, accelerometers, badge readers, etc. In some cases, the content items 602, 604, 606 can also include content items received from external (e.g., local or remote) devices, such as camera systems, servers, sensors, IoT devices, networks, etc.

The camera system 120 can tag the content items 602, 604, 606 with respective tags 602A, 604A, 606A containing information about the content items 602, 604, 606, such as recording dates, content sizes, content types (e.g., video, audio, image, text, etc.), content descriptions, events detected in the content, objects detected in the content, activities detected in the content, humans detected in the content, audio detected in the content, scenes captured by the content, conditions detected in the content, attributes of elements detected in the content, quality of the content, information about the area or location captured by the content, relative locations of elements detected in the content, etc.

For example, the tags 602A, 604A, 606A can identify a date/time of recording, a person captured in the recording (e.g., an eyewitness, an attacker, a victim, a security guard, a person of interest, a suspect, etc.), attributes of the person captured in the recording (e.g., gestures, emotions, clothing, body language, movement, etc.), a noise captured by the recording, an object (e.g., cars, weapons, doors, recording devices, etc.) in the area at the time of the recording, an event (e.g., a fire, an assault, vandalism, a theft, an accident, a safety violation, a burglary, a transaction, an interaction, etc.) captured by the recording, a condition captured in the recording (e.g., rain, an open door, running equipment, malfunctioning device, etc.), an activity captured in the recording (e.g., a conversation, an interaction, a reaction, a response, a phone call, movement, an individual taking a picture or recording video, etc.), location information (e.g., location of an event, location of an object, location of a human, proximity of one or more objects or humans, sound localization information, etc.), and so forth.

The tags 602A, 604A, 606A can be generated based on analysis of the content items 602, 604, 606 using sensing, detection, and/or recognition technologies, such as facial recognition, voice recognition, speech recognition, image recognition, object recognition, smoke detection, motion detection, tampering detection, etc. For example, the camera system 120 can analyze the content and generate the tags 602A, 604A, 606A based on features detected in the content and recognition results. The camera system 120 can store the content items 602, 604, 606 with the tags 602A, 604A, 606A. The tags 602A, 604A, 606A can provide labels or information describing the content.

In some cases, the tags 602A, 604A, 606A can not only identify items in the content of the content items 602, 604, 606, but also identify items that have not been identified or detected in the content of the content items 602, 604, 606. For example, the tags 602A, 604A, 606A can indicate that no events, objects, activities, humans, etc., have been detected or identified in the content. Thus, the tags 602A, 604A, 606A can identify the presence or occurrence of something but may also identify the lack of a presence or occurrence of something. The lack of something in the content, such as a human or event, can also provide valuable information for prioritizing content. For example, a content item that does not capture any events or activity can be given a lower priority than other content items that detect events or activity based on an assumption that the lack of events or activity signify that the content item does not provide information of interest about particular events.

FIG. 6B illustrates an example index 620 of information about content items on the camera system 120. The index 620 can include tag data (e.g., tags 602A, 604A, 606A), including any information identified, detected, recognized, etc., about the content items on the camera system 120. In this example, the index 620 includes identifiers 622 of the content items on the camera system 120, names 624 of the content items, types 626 of the content items, sizes 628 of the content items, timestamps 630 of the content items, and labels 632 for the content items. Thus, the index 620 can identify each unique content item on the camera system 120, a type (e.g., file type, data type, etc.), the size of each content item, a recording time/date of each content item, and other labeled or tagged information for each content item.

The labels 632 can include tags, such as the tags 602A, 604A, 606A. For example, the labels 632 can index information about the content in each content item, such as a quality, any objects detected, any events detected, any activities detected, any conditions detected, location information, descriptive information, etc. The labels 632 can also index source information about the content items, such as a recording device or sensor that generated the content. For example, for data obtained from a remote camera system or sensor, such as recordings or sensor data, the labels 632 can identify the source of such data.

The index 620 can store any characteristics known or detected for each content item, which can be used to prioritize content items for a prioritized backup and/or determine ways to reduce network bandwidth for a backup. In some cases, the index 620 can be queried by the camera system 120 for a backup or in response to detecting a situation triggering a backup (e.g., a threat), and use the query results to perform prioritization as described herein. In some cases, the index 620 can include prioritization or ranking information calculated and stored by the camera system 120 for use for current and/or future backups.

Figure 6C:
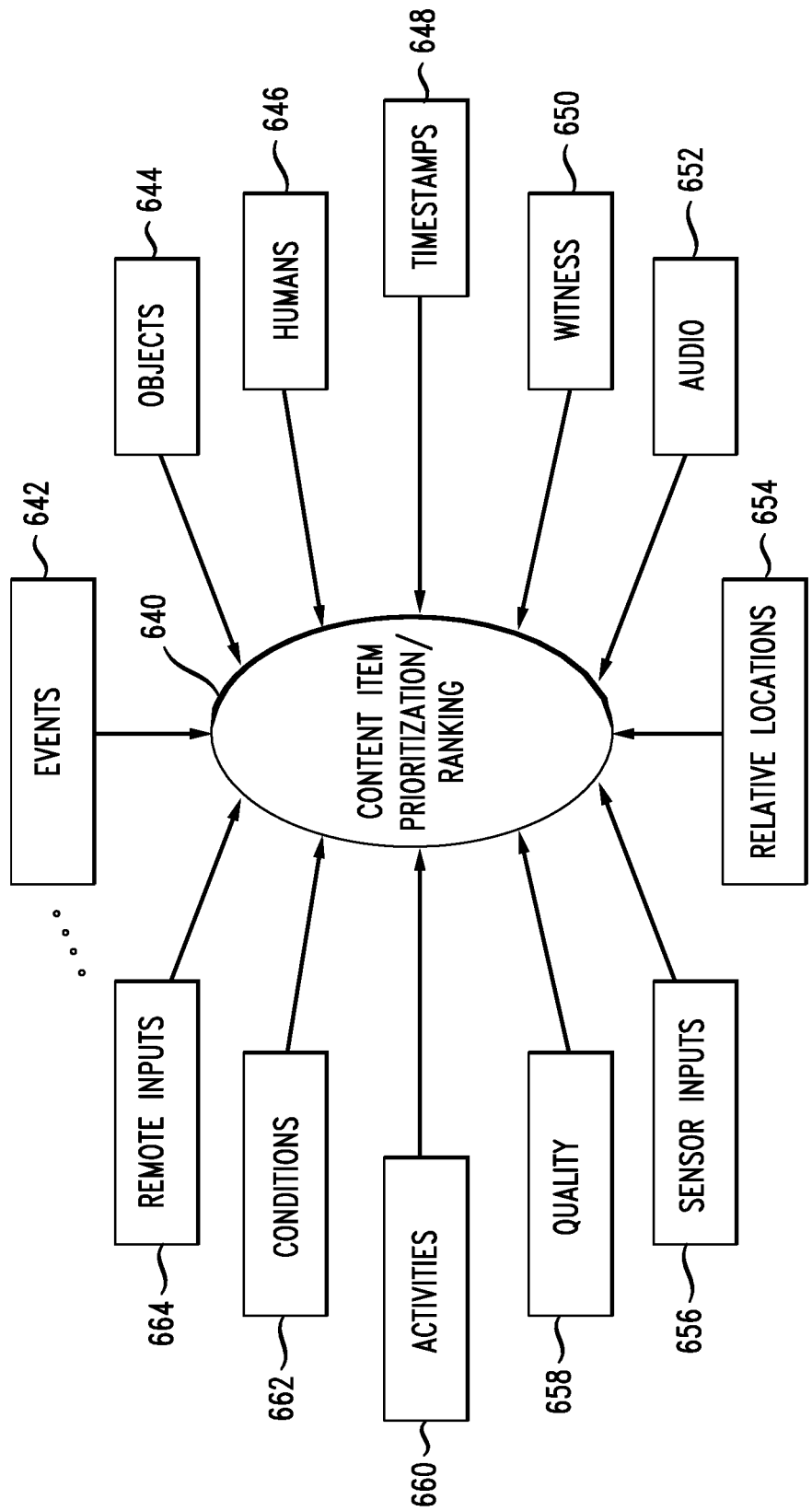
FIG. 6C illustrates an overview of an example system for prioritizing or ranking content items for backups.

FIG. 6C illustrates an overview of an example system for prioritizing or ranking content items for backups. Content item prioritization and ranking system 640 can be implemented by one or more components in the camera system 120, such as image processing unit 204, detection and analysis unit 210, controller 212, audio unit 216, sensors 214, etc., as shown in FIG. 2.

Content item prioritization and ranking system 640 can use inputs 642-664 to prioritize and/or rank content items on the camera system 120. The inputs 642-664 can be based on tags in the content items, such as tags 602A, 604A, 606A, and/or indexed information, such as information in index 620. The inputs 642-664 can include, for example, events 642, objects 644, humans 646, timestamps 648, witnesses 650, audio 652, relative locations 654, sensor inputs 656, content quality 658, activities 660, conditions 662, and remote inputs 664.

The objects 644 can include any recognized objects, such as natural objects, man-made objects, animals, or any other physical objects. The objects 644 can also include characteristics of the associated objects, such as shape, size, position or location, motion, color, proximity to other things, etc. The humans 646 can include recognized humans (e.g., facial recognition) and human characteristics such as clothing, gestures, emotions, activity, location, etc. The audio 652 can include recognized sound or speech and/or audio characteristics such as sound level or frequency, sound localization, sound source, sound direction, sound pattern, type of sound, etc.

The inputs 642-664 can include any information of interest for determining prioritization or ranking. In some cases, the inputs 642-664 can include human or personal events as well as natural or man-made disasters or incidents. Data from neighboring cameras or sensors can assist in identifying events, objects, humans, or information of interest for inputs 642-664. For example, footage index information, such as index 620, can be requested from other cameras in the network prior to, or during, an event triggering a backup, and used to generate inputs 642-664.

Human or personal events of interest can include footage with a suspected attacker (e.g., an attacker of the camera system 120 or any other object or human). Matching from a live stream to a recorded stream can be based on facial recognition, clothing, body language, voice recognition, emotion recognition, sound localization, or other identifying physical characteristics. Human or personal events of interest can also include footage with possible associates of a suspected attacker or person of interest. For example, one or more individuals may have walked with the attacker, conversed with the attacker, shared a vehicle with the attacker, exchanged an object with the attacker, or crossed paths with the attacker. This information can be of interest when determining prioritization or ranking. Other human or personal events of interest can include possible eyewitnesses. An eyewitness can be within a visual or hearing range of an event or human. Estimated vision and hearing range of humans on video can be used to detect witnesses. Witnesses can provide valuable information and may be of interest. As such, witnesses can be considered when prioritizing content.

Strong emotional responses or reactions of humans, such as surprise or distress emotions, can be of interest and used to prioritize content. Human emotions and responses can indicate a person's intent, interpretation of an event, etc. Certain human activities can also be of interest and used for prioritization. For example, footage capturing a person taking a picture or recording footage can be prioritized, as the footage can be used to identify the person and possibly obtain additional, recorded information. To illustrate, footage containing a person using a smartphone to record an accident can be prioritized, as the footage can be valuable in identifying the person as a witness and possibly obtaining the recording from the smartphone. Non-human audio, such as alarms or noises, around an event of interest and the location of the source of the non-human audio can also be of interest and used to prioritize content.

As previously mentioned, natural or man-made disasters or incidents represented in the inputs 642-664 can also be of interest and used to prioritize content. For example, people near a start of a disaster can be of interest and used to prioritize content. Safety violations by humans or vehicles captured by a recording, such as a car violating traffic rules, a person failing to close a door, a person failing to turn off a system (e.g., stove, soldering iron, heavy machinery, etc.), can be of interest and used to prioritize the content recording such violations. Footage of a natural disaster can be prioritized, as it can be valuable in determining a cause, damage, response, disaster characteristics, etc.

Figure 7A:
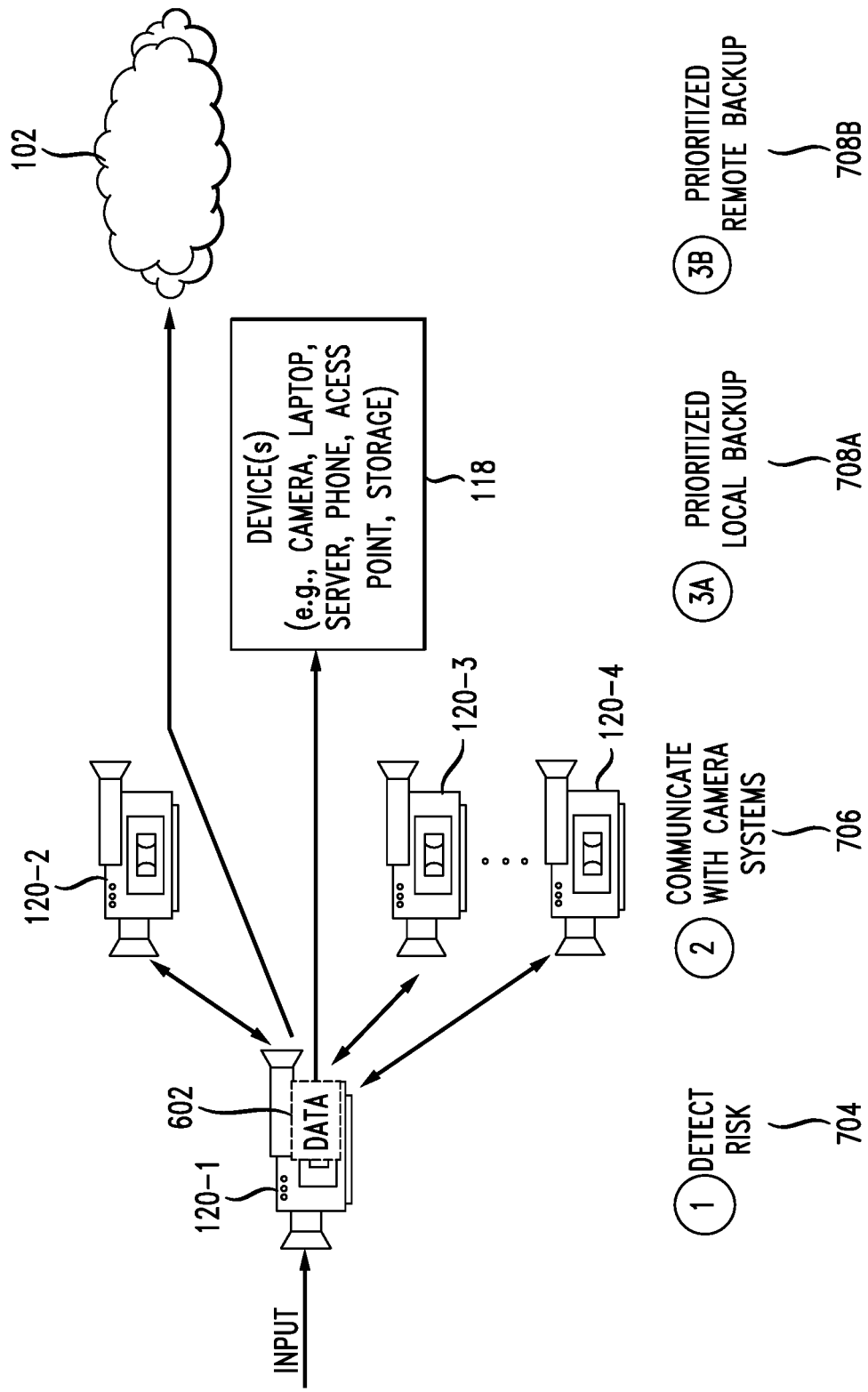
FIG. 7A illustrates an example diagram of a prioritized backup of video segments stored on a camera system in response to a detected risk.

FIG. 7A illustrates an example diagram of a prioritized backup of video segments stored on a camera system 120-1 in response to a detected risk. In this example, camera system 120-1 can store data 702 captured by the camera system 120-1 from while recording from a particular location. The data 702 can include image and video data, such as video frames, segments, files, etc., as well as other data such as audio, metadata, sensed data (e.g., motion, environmental conditions, objects, etc.). When the camera system 120-1 detects a risk 704 that has a threshold probability of causing damage to the camera system 120-1 and/or loss of the data 702, the camera system 120-1 can initiate a prioritized data backup procedure.

In some cases, the camera system 120-1 may first communicate 706 with one or more camera systems 120-2, 120-3, 120-4 on the local network, in order to verify the risk 704 with one or more of the other camera systems 120-2, 120-3, 120-4, or send the data 702 to one or more of the other camera systems 120-2, 120-3, 120-4 according to respective data priorities for storage at one or more of the other camera systems 120-2, 120-3, 120-4. For example, the camera system 120-1 can request from the camera systems 120-2, 120-3, 120-4 a risk assessment or verification, or relevant data captured by the camera systems 120-2, 120-3, 120-4. Camera systems 120-2, 120-3, 120-4 may have different perspectives of the event and thus may have event-related data or risk assessment information that can be used to verify, supplement, or contradict the risk 704 predicted by the camera system 120-1, or otherwise enhance the data used to predict or detect the risk 704.

If the camera systems 120-2, 120-3, 120-4 have event data or risk assessment information the camera system 120-1 and/or camera systems 120-2, 120-3, 120-4 can re-assess the risk based on the combined data and/or risk assessment information. If the re-assessment results indicate that the risk 704 was incorrectly detected (e.g., no risk exists, a risk exists but is below a threshold, etc.), the camera system 120-1 may determine not to perform a prioritized backup of the data 702. On the other hand, if the camera system 120-1 and/or camera systems 120-2, 120-3, 120-4 confirm the risk 704, the camera system 120-1 can continue with the prioritized backup. In some cases, the camera system 120-1 may first attempt to backup the data 702 on one or more other camera systems 120-2, 120-3, 120-4 in the local network. Whether to backup data at the one or more camera systems 120-2, 120-3, 120-4 in the local network can depend on one or more factors, such as urgency of backup, type of risk or event, physical location of the camera systems 120-2, 120-3, 120-4, etc.

For example, if the type of risk is vandalism from a human and one of the camera systems 120-2, 120-3, 120-4 is located in an area at the site that is not accessible by humans or having a low access probability for the current risk (e.g., based on the distance between the human and the camera, the location of the camera relative to the human, etc.), the camera system 120-1 may backup the data 702 to that camera system given the low probability that the human will be able to physically damage the camera system and backed up data. On the other hand, if the type of risk is fire and the camera systems 120-2, 120-3, 120-4 all are vulnerable to damage from the fire, the camera system 120-1 may decide not to backup the data 702 to any of the camera systems 120-2, 120-3, 120-4 given a high probability that the camera systems 120-2, 120-3, 120-4 and their stored data will also be damaged by the fire.

When performing the prioritized backup of the data 702, the camera system 120-1 can identify other storage destinations in addition to, or in lieu of, the camera systems 120-2, 120-3, 120-4. For example, the camera system 120-1 can identify one or more local devices 118 or the cloud 102 as potential storage destinations. The camera system 120-1 can then select the one or more local devices 118 and/or the cloud 102 as the backup destination for the data 702. The backup destination can be selected based on one or more factors, such as urgency (e.g., predicted amount of time until damage), network conditions (e.g., bandwidth, congestion, connectivity, latency, etc.), threat type (e.g., localized threat, site-wide threat, device-specific threat, etc.), size of data backup, etc.

In some cases, the camera system 120-1 can decide to perform a prioritized local backup 708A of the data 702. For example, if the backup is urgent (e.g., the predicted amount of time until damage very small) and/or the threat is localized to either the camera system 120-1 or a subarea of the site where the camera system 120-1 is located, the camera system 120-1 can select to perform a prioritized local backup 708A to one or more devices 118 on the local network (e.g., local network 116). The one or more devices 118 can be selected from within the local network based on a proximity to the threat or a security level predicted for the one or more devices 118 vis-à-vis the particular threat. The one or more devices 118 can include a server, a network area storage system, a backup disk, a camera system, or any other computing device having available storage.

In some cases, the camera system 120-1 can select to perform a prioritized remote backup 708B of the data 702. For example, if the threat applies to the entire physical location, a device on the local network with a risk below a threshold is not identified, a predicted amount of time until damage is above a threshold, a local device having the storage or resources necessary for a local backup, or the network conditions are above a threshold for a remote backup, the camera system 120-1 can select to perform a prioritized remote backup 708B to the cloud 102. The cloud 102 can provide a safer destination than the local network but may carry a higher latency and thus decrease the amount of data that can be backed up within a period of time. These factors can be balanced when selecting the storage destination. The camera system 120-1 can also communicate with the cloud 102 prior to performing a backup to the cloud 102 to request help from the cloud 102 in selecting the destination or configuring the local network to prioritize network traffic associated with the backup. Since the cloud 102 can include additional processing resources, it can help quickly and precisely process the various factors in making a decision and managing the backup process.

In some examples, the camera system 120-1 can perform a hybrid backup process where it sends part of the data to a local destination and another part of the data to the cloud 102. For example, the camera system 120-1 can first backup the most urgent or critical data to a local destination that is further away from the risk, and then backup that same data to the cloud 102 for more permanent or secure storage. As another example, the camera system 120-1 may backup the most urgent or critical data to the cloud 102 where it is more secure, and switch to a local destination once the most urgent or critical data has been backed up to the cloud 102 in order to backup lower priority data to the local destination having a higher risk of damage than the cloud 102 but lower risk than the camera system 120-1. As yet another example, the camera system 120-1 may begin a prioritized remote backup 708B to the cloud 102 and during the backup determine that the urgency of the backup has changed based on changing characteristics of the risk or threat, such as amount of time predicted until loss of data, and thereafter switch to a prioritized local backup 708A to a local destination having lower latency or higher likelihood of completion before damage.

The prioritized local backup 708A and the prioritized remote backup 708B can backup the data 702 according to priorities or rankings of the data 702. Higher priority or ranking data can be backed up before lower priority or ranking data. The priorities or rankings of the data 702 can be determined by a content item prioritization and ranking system 640 on camera system 120-1 based on inputs 642-664 as previously described. The inputs 642-664 can be based on tags (e.g., tags 602A, 604A, 606A), an index (e.g., index 620), and/or any other information on camera system 120-1, such as content, tags, sensor data, and index information from camera systems 120-2, 120-3, and/or 120-4.

Figure 7B:
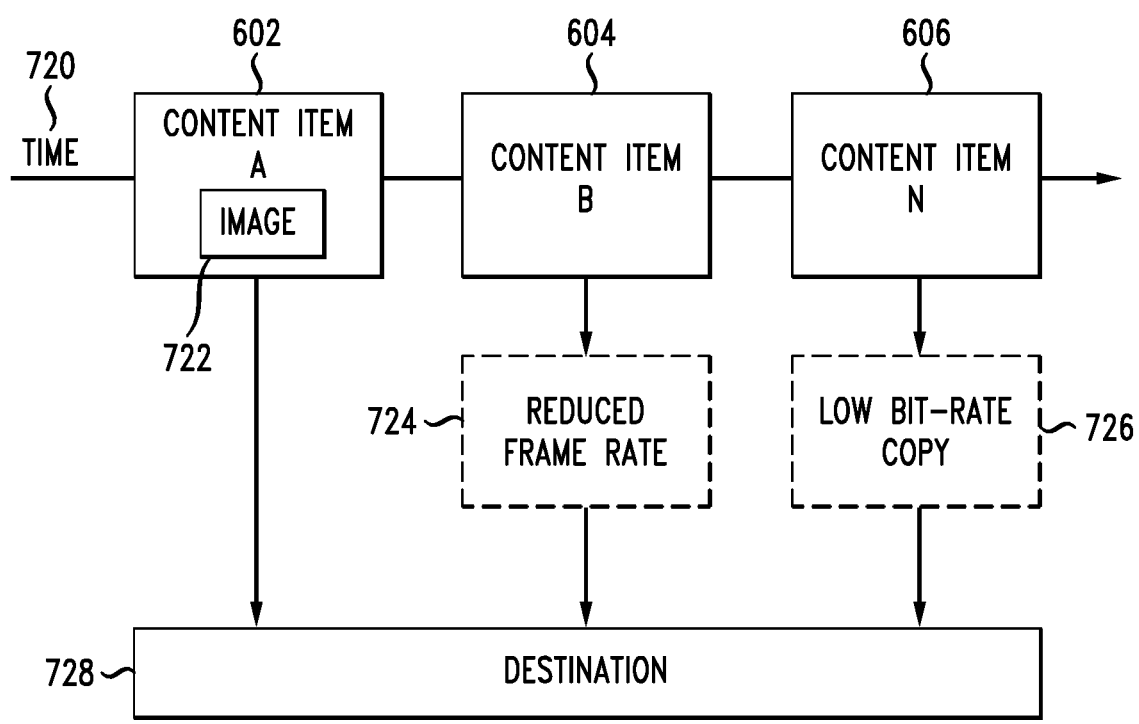
FIG. 7B illustrates an example backup configured to reduce network bandwidth use.

FIG. 7B illustrates an example backup configured to reduce network bandwidth use. Reducing the network bandwidth use or requirement for a backup can increase the speed of the backup and the amount of data of interest backed up over a network within a time constraint. In this example, the time 720 depicts the flow of time during a backup triggered by a detected threat or any other event which may impose time constraints for the backup.

The content items selected for the backup in this example include content items 602, 604, and 606. The backup destination 728 can be the cloud 102 and/or one or more nodes 118 or camera systems 120 on the local network 116. To reduce the time and bandwidth for backing up content items 602, 604, 606 to the backup destination 728 given a time constraint (e.g., imminent threat of damage), the camera system can portions of interest within the content items 602, 604, 606 and/or copies of the content items 602, 604, 606 having a smaller data size.

For example, assume content item 602 is an image or frame. Instead of backing up the entire image or frame(s) of content item 602, the camera system can cut or crop the image or frame(s) to image 722 containing a smaller area of interest (e.g., an area around a person or object), and backup the image 722 containing the smaller area of interest. The cut or cropped image or frame containing the smaller area of interest (i.e., image 722) can use less network bandwidth and complete transmission faster than the full image or frame(s) of the content item 602. The camera can later attempt to backup the full image or frame(s) of content item 602 if time permits. As another example, instead of backing up the full video in content item 602, the camera system can take a screenshot of a portion of interest to generate image 722, and backup the image 722 containing the screenshot. Again, the camera system can attempt to backup the entire content item 602 later if time permits.

As another example, the camera system can generate a copy 724 of content item 604 having a reduced frame rate, and backup the copy 724 having the reduced frame rate rather than the content item 604 at the full frame rate. In some cases, the camera system can backup a full resolution screenshot of content item 604 to offset any loss. The camera system can also fill the remaining frames later if time permits.

Moreover, to backup information of interest from content item 606, the camera system can obtain a low bit-rate copy 726 of the content item 606 and backup the low bit-rate copy 726 instead of the original content item 606, in order to reduce the necessary bandwidth and increase the backup speed. The camera system can later backup the higher bit-rate version (e.g., content item 606) if time permits.

The camera system can also perform other strategies for reducing the size and/or amount of content backed up to the destination 728 and thus increase the amount of critical or important information backed up given the time constraints of the backup triggering event (e.g., threat of damage or data loss). The camera system can also de-prioritize content items deemed not useful due to one or more factors, such as low quality. The camera system can also de-prioritize content items based on size to increase efficiency. For example, the camera system can de-prioritize content items that are above or below a size threshold, which can indicate the content items are too small to provide any valuable information or too large to send within a time constraint.

Figure 8:
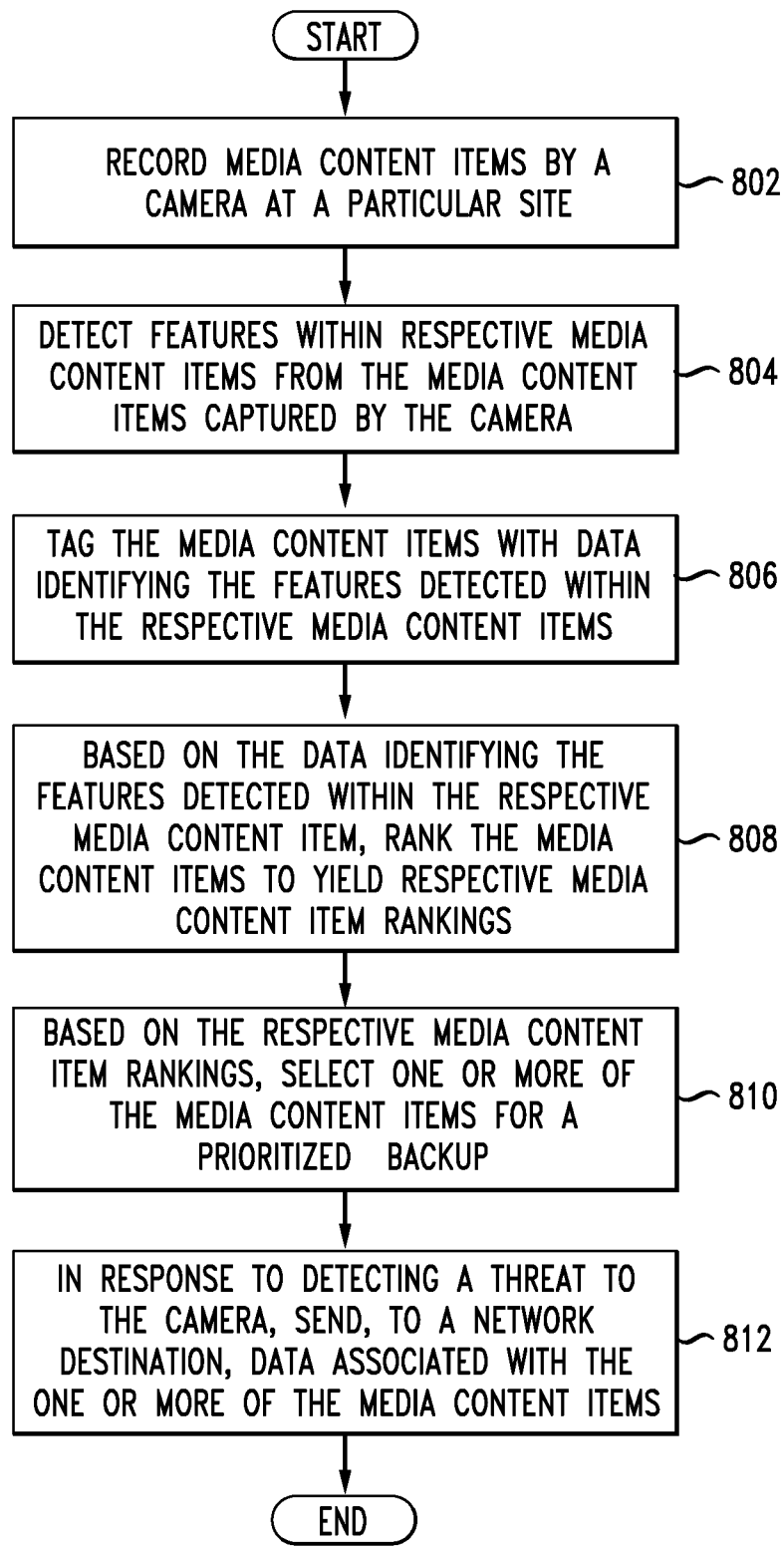
FIG. 8 illustrates an example method for prioritizing camera data and reducing network bandwidth of camera data backups.

Having disclosed example system components and concepts, the disclosure now turns to the example method for prioritizing camera data and reducing network bandwidth of camera data backups, as shown in FIG. 8. For the sake of clarity, the method is described with reference to the camera systems 120 and cloud 102, as shown in FIG. 1, configured to perform the various steps in the method. The steps outlined herein are examples and can be implemented in any combination thereof, including combinations that exclude, add, or modify certain steps.

At step 802, the camera system 120 records media content items (e.g., 602-606) captured by the camera system 120 at a particular site (e.g., building 422). The camera system 120 can store the recorded media content items on a local storage, such as storage unit 206. The camera system 120 can record video, audio, images, sensor data, etc., as previously explained.

At step 804, the camera system 120 detects features within respective media content items from the media content items captured by the camera system 120. The features can include information about the content items and information captured by the recording of the media content items such as, for example, recorded events, recorded humans, recorded objects, recorded audio or noises, recorded scenes, recorded activities, recorded conditions (e.g., environmental conditions, recording conditions, scene conditions, context conditions, etc.), recorded attributes (e.g., human attributes, object attributes, event attributes, sound attributes, etc.), sensed data (e.g., localization information, proximity information, movement, temperature, physical impact or shock information, position information, etc.), recording information (e.g., recording location, recorded area, recording date/time, recording length, recording settings, recording characteristics, etc.), content item information (e.g., file type, file size, filename, file quality, etc.), and so forth.

The camera system 120 can detect the features using various analysis and recognition technologies as previously described, such as facial recognition, object detection, motion detection, smart scene recognition, sound localization, human emotion recognition, image recognition, noise recognition, speech recognition, etc. For example, the camera system 120 can use various analysis and recognition technologies to identify humans in a video recording, human characteristics (e.g., emotions, gestures, clothing, etc.), objects in the video recording (e.g., cars, weapons, other devices such as cameras or smartphones, doors, windows, roads, street signs, etc.), events in the video recording (e.g., a fire, a flood, a burglary, an assault, a car accident, a robbery, vandalism, a breach in an area, etc.), activities of humans in the video recording (e.g., conversations, confrontations, walking, exchanging objects, running, driving, firing a weapon, recording an image or video, etc.), location information (e.g., location of an object, proximity of a human to another human or object, proximity of an object such as a camera to an area such as an entrance, sound localization, etc.), etc.

At step 806, the camera system 120 tags the media content items with data (e.g., tags, labels, etc.) identifying the features detected within the respective media content items. For example, the camera system 120 can add tags to specific content items identifying the features recognized within the specific content items. In some cases, the camera system 120 can index the data and/or any information about the features detected and the media content items. For example, the camera system 120 can generate an index (e.g., index 620) for the media content items maintaining information about the media content items and the features detected within the media content items (e.g., date, timestamp, localization information, file type, file quality, file size, events detected, objects detected, humans detected, etc.).

Based on the data identifying the features detected within the respective media content items, at step 808, the camera system 120 ranks or prioritizes the media content items to yield respective media content item rankings. The respective media content item rankings can rank or prioritize the media content items based on the features detected within the media content items. The respective media content rankings can also rank or de-prioritize media content items based on features related to the media content items or a lack of features detected in the media content items. For example, the camera system 120 can de-prioritize media content items that are below a threshold quality, media content items that do not capture any events or humans, and/or media content items that do not have any features of interest with respect to, for example, quality, size, contents, recording date, etc.

Based on the respective media content item rankings, at step 810, the camera system 120 selects one or more of the media content items for a prioritized remote backup. The camera system 120 can select one or more media content items based on the respective media content item rankings, with higher ranked media content items being selected before, or prioritized over, media content items having lower rankings. The camera system 120 can select media content items individually based on rankings or in groups. For example, the camera system 120 can select the highest ranking media content item, perform a backup of the highest ranking media content item as explained at step 812, and subsequently select the next highest ranking media content item for a subsequent media content item backup. In this way, the camera system 120 can individually select and backup media content items in an order based on the rankings. In other examples, the camera system 120 can select a group, such as the top n highest ranking media content items as a first batch of media content items for backup (parallel and/or consecutive backup), and subsequently select another group of media content items to be backed up after the first batch of media content items have been backed up or an attempt has been made.

In response to detecting a threat to the camera, at step 808, the camera system 120 sends, to a network destination (e.g., the cloud 102, one or more nodes 118, etc.), data associated with the one or more of the media content items, the data being sent according to one or more rules defined for the prioritized remote backup. The data associated with a content item can refer to the entire content item, a portion of the content item, data within the content item, metadata associated with the content item, and/or any data associated with the content item. For example, the data associated with a content item can be the entire content item (e.g., entire, original video file), a low bit-rate copy of the content item, a reduced frame-rate copy of the content item, a lower resolution copy of the content item, a compressed copy of the content item, a trimmed copy of the content item, a cropped copy of the content item, a reduced quality copy of the content item, etc. Whether the data backed up for a content item should be the entire content item or any other portion or data associated with the content item can be determined based on one or more rules for backing up content, as previously described with reference to FIG. 7B and further described below.

The one or more rules for sending data in the prioritized backup can include rules for prioritizing content, rules for selecting backup destinations, and/or rules for reducing network bandwidth in a backup, as previously described with reference to FIGS. 6C, 7A, and 7B. For example, the one or more rules can include the rankings from step 808. Here, the rankings can be treated as rules for defining backup priorities, sequences, etc. As another example, the rules can include rules or parameters for reducing bandwidth for the backup.

To illustrate, the rules can include rules or parameters for reducing the size of the data being backed up, such as reducing a frame rate of a file, lowering the bit-rate of a file, cropping an image to an area of interest, capturing a screenshot for one or more frames, trimming a video file, lowering a quality or resolution of an image or video file, compressing a content item. To illustrate, when sending backup data to the network destination, the camera system 120 can prioritize copies or versions of the data requiring less bandwidth to backup. Thus, instead of backing up a full or original recording, the camera system 120 can first backup the recording at a reduced frame rate, a lower bit-rate, a lower quality, etc. Moreover, instead of backing up the full or original recording, the camera system 120 can backup a copy or version of the recording that has been trimmed to exclude portions of less interest (e.g., portions having lower quality, portions that do not capture an event or object of interest, etc.), cropped to reduce an image or frame to an area of interest (e.g., an area capturing an object or event of interest, an area capturing a portion of a view or scene of interest, etc.), compressed to reduce the size of the data, and/or modified to reduce the overall size and/or amount of data for the backup while minimizing or avoiding loss of information of interest.

As previously mentioned, the specific data backed up for a particular content item can be strategically selected to reduce the size of the backup for the particular content item without, or with limited, negative impact on the ability to capture the information of interest pertaining to the content item through the data backed up for the particular content item. In some cases, a smaller copy of a content item (e.g., a trimmed copy, a cropped image or frame, a low-bit rate copy, a reduced frame rate copy, a lower resolution copy, a screenshot copy of a video or frame, etc.) can be backed up in lieu of the content item without reducing the smaller copies ability to capture the information of interest pertaining to the content item (e.g., the information in or about the content item attributed to the content item's ranking or priority) below a threshold. The threshold can be based on, for example, the degree to which the backed up content can be useful in identifying or understanding the information of interest associated with the content item.

In some cases, the camera system 120 can backup the full or original version of the content item later in the backup process, after backing up data associated with the full or original version of the content item (e.g., a smaller copy) if time permits. For example, the camera system 120 can backup a reduced frame rate copy of a video and/or a screenshot of the video based on the ranking or priority of the video. The camera system 120 can continue backing up other data or content items selected for backup based on the rankings. Once the camera system 120 has completed backing up the data or content items selected for backup and/or a portion of the data or content items selected for backup (e.g., data associated with the top n content items), the camera system 120 can go back and backup the full or original version of video after having backed up the reduced frame rate copy and/or screenshot of the video, if time permits (e.g., if the ability of the camera system 120 to continue backing up data has not been impeded by the threat). The camera system 120 can continue to backup lower priority content items or go back and backup different versions or copies of content items previously included in the backup (e.g., full copies or original versions) until the threat is gone or the threat impedes the ability of the camera system 120 to continue with the backup process.

In some cases, the camera system 120 may backup the full or original version of the content item instead of a smaller portion of data (e.g., reduced data size) associated with the content item even if the smaller portion of the data is available and/or viable. For example, the camera system 120 may estimate based on the threat that the camera system 120 has sufficient time to perform a larger, more bandwidth intense backup before the threat is likely to damage the camera system 120 or otherwise hamper the ability of the camera system 120 to backup data. As another example, the camera system 120 may determine that the content item is of high interest and should preferably be backed up without any reduction in the size, quality or amount of data in the content item. For example, a top ranking content item may be of high interest because it captures the moment immediately before an event of interest, such as a crime. The camera system 120 may determine to backup the entire content item given the high priority and interest of the content item rather than attempting to reduce the network bandwidth usage by reducing the size, quality, or amount of data in the backup of the content item.

In some cases, the camera system 120 may first backup a modified version of the content item (e.g., trimmed, cropped, reduced quality, reduced size, etc.) to ensure at least some information of interest is backed up prior to any damage to the camera system 120 and/or the data stored by the camera system 120, and after backing up the modified version (e.g., immediately after a successful backup of the modified version), the camera system 120 may then attempt to backup the full or original version of the content item. If the camera system 120 detects an imminent threat, the camera system 120 may have a greater likelihood of completing a backup of the modified version of the content item before being damaged than a backup of the full or original version of the content item. Thus, the camera system 120 may be able to complete a backup of the modified version of the content item prior to being damaged and ensure at least some of the data of interest is saved, even if the camera system 120 may not have otherwise had sufficient time to backup the full or original version of the content item.

When backing up data (i.e., sending the data to the network destination), the camera system 120 can increase the performance of the backup by adjusting priority markings on the packets of data and/or adjusting quality-of-service (QoS) parameters on the network. For example, the camera system 120, one or more nodes 118 in the local network 116, and/or the cloud 102 can adjust QoS parameters and the behavior of the network (e.g., local network 116) to give network preference or priority to the data backed up by the camera system 120. In some cases, the QoS parameters can be adjusted to prioritize the type of data associated with the data from the camera system 120. For example, if the data to be backed up from the camera system 120 is mostly video, the QoS parameters can be adjusted to prioritize video traffic. The camera system 120 can include QoS markings in the packets transmitted during the backup to ensure the packets are given priorities as defined by the QoS parameters. The configurations of the network devices (e.g., switches, routers, access points, etc.) in the network can also be adjusted in other ways to prioritize traffic from the camera system 120 during the backup. For example, filtering rules can be implemented to block, filter, or reduce traffic through the network originating from other devices, and/or addresses, ports, protocols, network segments, etc., that are not associated with the camera system 120 or the data backed up from the camera system 120. To illustrate, the filtering rules can block, filter, or reduce traffic through the network based on IPs (source IPs, destination IPs, etc.), media access control (MAC) addresses, device names (e.g., hostnames), ports (e.g., port 80 and/or 443 to reduce web traffic if the data backup is not expected to use ports 80 or 443, etc.), VLANs, etc.

As noted herein, the camera system 120 can detect the threat based on one or more factors which indicate a human threat, such as vandalism, or a natural threat, such as a fire or flood. The one or more factors can be determined based on one or more operations of the analyzing, classifying, detecting and recognizing operations described above with respect to FIG. 2. The one or more factors can include an event, such as a fight, commotion, argument, crime, activity, tornado, fire, flood, etc.; an object, such as a weapon, a bat, a brick, etc.; a status of the camera system 120 and/or the scene, such as an obstruction of view of the camera system 120, a disappearing object from a scene or area, a re-positioning of the camera system 120, an impact to the camera system 120 and/or an object within the scene or view (e.g., an impact to a human, car, building, door, etc.), etc.; a sound, such as a loud noise, scream, crash, breaking sound, blast, thunder, alarm, etc.; speech, such as an argument, comment, verbal threat, etc.; a motion, such as a human motion, object motion, camera motion, etc.; a signal from one or more devices, such as an alert from another camera system, message from the cloud 102, report from the news, etc.

The one or more factors can include specific characteristics associated with a human or object in a surrounding area, which can be considered when identifying the threat. For example, the one or more factors can include a human gesture, a facial recognition, a human emotion, a sound classification, an object identity, an object or human position or placement, etc. Certain factors or characteristics can be indicative of a specific condition or threat, such as certain emotions (e.g., anger, aggression, distrust, nervousness, sadness, confusion, etc.), certain gestures (e.g., aggressive hand or body gestures, hand signaling, etc.), certain activities (e.g., fighting, pointing, aiming with an object, hiding, screaming, attacking a human or property, etc.), certain noises (e.g., thunder, blasts, loud noises, alarms, breaking noises, etc.), certain speech (e.g., verbal threats, aggressive speech, loud speech, aggressive tone, suggestive comments, etc.), certain movements (e.g., camera view obstruction movements, object concealment, furtive movements, etc.), certain behavior (e.g., erratic behavior, aggressive behavior, suggestive behavior, etc.), certain objects can be indicative of a threat (e.g., weapons, bricks, bats, hammers, etc.), and so forth.

When detecting the threat, the camera system 120 can assess a risk of damage to data stored at the camera system 120. The threat can be determined when the risk exceeds a threshold risk of damage. The threshold risk can be determined by identifying the threat posed by one or more conditions or factors, and estimating or predicting the likelihood that such threat may result in damage to the camera system 120 or loss of data stored on the camera system 120. The threshold risk and threat can be determined based on the one or more factors as previously mentioned, as well as predetermined rules, algorithms, deep learning networks, classification models, metrics, data representations, constraints, user preferences, etc. For example, the camera system 120 can consider a list of rules to determine a risk and threat; mapping the one or more conditions and/or associated factors to specific risk or threat factors predefined for assessing risks and threats; generating one or more classification models based on the data; implementing machine learning algorithms, deep learning and neural networks, etc.

When determining the threshold risk, the camera system 120 can collect and analyze other data, such as statistics, captured data from other camera systems (e.g., video, image, audio, and sensor data captured by other camera systems in the particular area), information obtained from one or more sources such as the Internet or a news site, threat or condition alerts, weather data, external databases (e.g., law enforcement databases, forecast databases, incident databases, databases maintained by states or municipalities, etc.), risk assessment factors or results from other devices (e.g., other camera systems on the network, the cloud 102, etc.), user input (e.g., preferences, notifications, etc.), and so forth. The camera system 120 can coordinate with other devices, such as nearby camera systems or the cloud 102, to determine the threshold risk or the threat. For example, the camera system 120 can communicate with other camera systems that have captured video in the surrounding area to request verification of a threat or risk assessment or comparison of respective threat or risk assessments, and/or the cloud 102 to request a determination or assessment from the cloud 102.

The camera system 120 can also consider information gathered from previous events associated with the camera system 120 or other camera systems. For example, the camera system 120 can review factors and/or conditions identified from 1000 damage events encountered by various camera systems, and use those factors and/or conditions to aid in estimating the likelihood that one or more conditions or factors detected pose a threat and a threshold risk.

The threshold risk can depend on user preferences and/or context information. For example, in some cases, an administrator may configure a low threshold or sensitivity for the risk. In other examples, the administrator may configure a high threshold or sensitivity for the risk. The threshold or sensitivity can depend on user preferences, which may depend on the value of what is being surveilled by the camera system 102 (e.g., a bank may have a lower threshold than a soccer field), the inherent risk in the area of the particular site or camera system 102 (e.g., high crime area may have a lower threshold than a low crime area, a nuclear facility may have a lower threshold than a toy factory, etc.), the time or date of the event (e.g., night hours may be configured to apply a lower threshold than daytime hours), etc.

Figure 9:
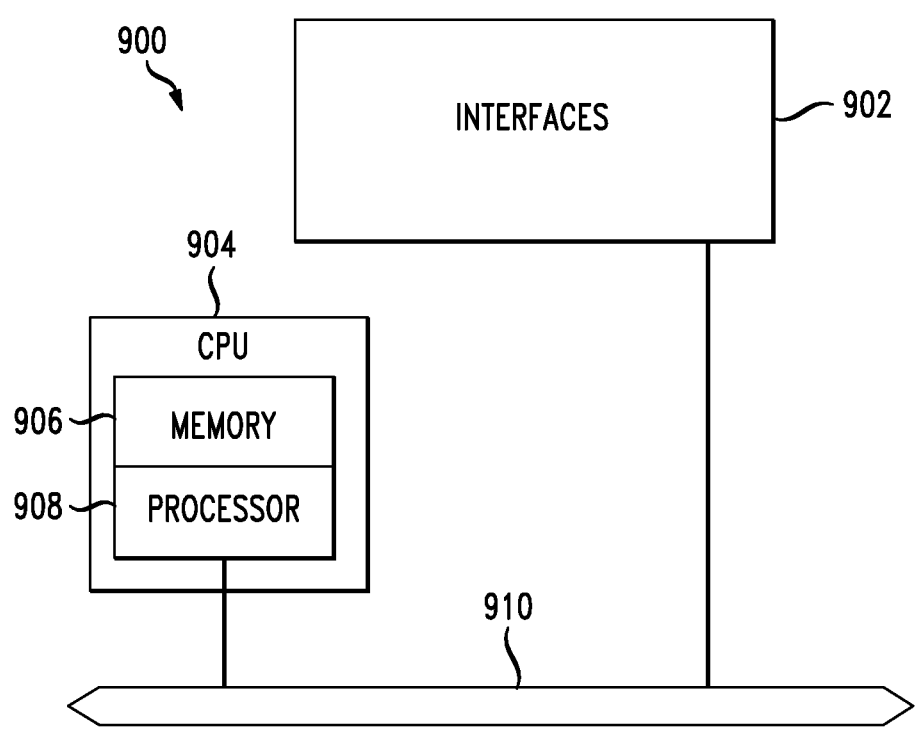
FIG. 9 illustrates an example network device.
Figure 10:
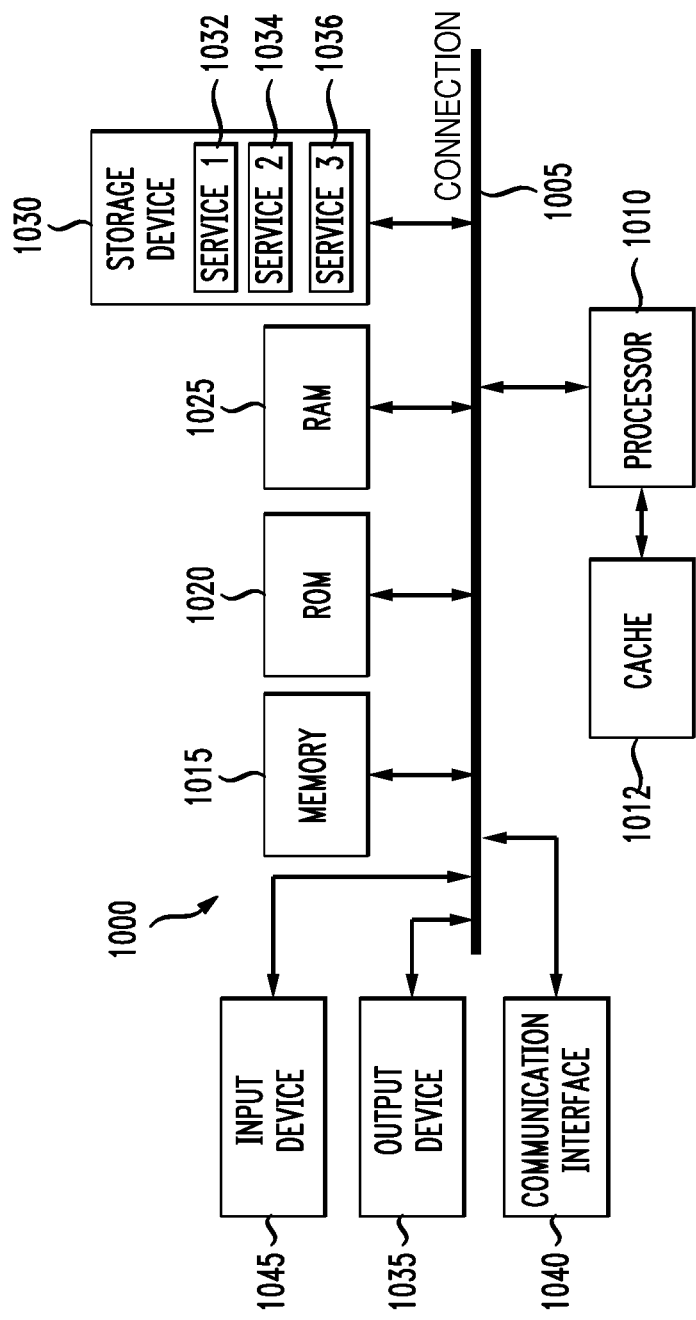
FIG. 10 illustrates an example computing device.

The disclosure now turns to FIGS. 9 and 10, which illustrate example network devices and computing hardware components, such as switches, routers, controllers, client devices, computing device hardware, and so forth.

FIG. 9 illustrates an example network device 900 suitable for performing switching, routing, assurance, and other networking operations. Network device 900 includes a central processing unit (CPU) 904, interfaces 902, and a connection 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, TCAM, etc.) also forms part of CPU 904. However, there are many different ways in which memory could be coupled to the system. In some cases, the network device 900 can include a memory and/or storage hardware, such as TCAM, separate from CPU 904. Such memory and/or storage hardware can be coupled with the network device 900 and its components via, for example, connection 910.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 904 to efficiently perform routing computations, network diagnostics, security functions, etc.

Although the system shown in FIG. 9 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC), which can be configured to perform routing, switching, and/or other operations. The ASIC can communicate with other components in the network device 900 via the connection 910, to exchange data and signals and coordinate various types of operations by the network device 900, such as routing, switching, and/or data storage operations, for example.

FIG. 10 illustrates a computing system architecture 1000 including components in electrical communication with each other using a connection 1005, such as a bus. System 1000 includes a processing unit (CPU or processor) 1010 and a system connection 1005 that couples various system components including the system memory 1015, such as read only memory (ROM) 1020 and random access memory (RAM) 1025, to the processor 1010. The system 1000 can include a cache of high-speed memory connected directly with, in close proximity to, or integrated as part of the processor 1010. The system 1000 can copy data from the memory 1015 and/or the storage device 1030 to the cache 1012 for quick access by the processor 1010. In this way, the cache can provide a performance boost that avoids processor 1010 delays while waiting for data. These and other modules can control or be configured to control the processor 1010 to perform various actions. Other system memory 1015 may be available for use as well. The memory 1015 can include multiple different types of memory with different performance characteristics. The processor 1010 can include any general purpose processor and a hardware or software service, such as service 1 1032, service 2 1034, and service 3 1036 stored in storage device 1030, configured to control the processor 1010 as well as a special-purpose processor where software instructions are incorporated into the actual processor design. The processor 1010 may be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include services 1032, 1034, 1036 for controlling the processor 1010. Other hardware or software modules are contemplated. The storage device 1030 can be connected to the system connection 1005. In one aspect, a hardware module that performs a particular function can include the software component stored in a computer-readable medium in connection with the necessary hardware components, such as the processor 1010, connection 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    detecting one or more features related to one or more media content items;
    tagging the one or more media content items with one or more identifiers based on the one or more features;
    ranking the one or more media content items based on the one or more identifiers;
    prior to detecting a threat, selecting the one or more media content items for a prioritized backup based on the ranking, the prioritized backup effective to cause higher ranked data to be backed up before lower ranked data when the threat is detected; and
    when the threat is detected, sending the higher ranked data associated with the one or more media content items to a network destination defined for the prioritized backup before sending the lower ranked data, the prioritized backup effective to cause lower-bit rate copies of content to be sent to the network destination defined for the prioritized backup before sending higher-bit rate copies of the content, when the lower-bit copies are available.

2. The method of claim 1,
    wherein,
        the one or more media content items include at least one of video files, audio files, image files, or sensor data, and
        the one or more features include objects, events or conditions.

3. The method of claim 2, wherein the one or more identifiers include tags identifying at least one of the objects, the events, the conditions, a respective recording time of the one or more media content items, a respective quality of the one or more media content items, or a respective time of capture of the at least one of the objects, the events, or the conditions.

4. The method of claim 1, wherein a selected image extracted from a frame is ranked higher and sent to the network destination defined for the prioritized backup prior to sending the frame.

5. The method of claim 3,
    wherein,
        the ranking of the one or more media content items is based on the tags, and
        the ranking of the one or more media items includes:
            increasing a ranking of a respective media content item based on one or more events captured by the respective media content item,
            decreasing the ranking of the respective media content item as the time of capture of the respective media content item is farther from a period of time associated with the one or more events,
            increasing the ranking of the respective media content item based on one or more objects captured by the respective media content item,
            increasing the ranking of the respective media content item based on one or more conditions captured by the respective media content item, or
            decreasing the ranking of the respective media content item when the respective quality of the respective media content item is below a threshold.

6. The method of claim 5, wherein the objects, the events or the conditions include at least one of: a presence of an object, an obstruction of a field of view of a camera, a tampering event, activity at a particular site, a fire, a flood, or a physical impact to the camera.

7. The method of claim 6, wherein the object includes a human and the one or more features include at least one of physical characteristics of the human, an emotion of the human, a gesture of the human, a facial recognition of the human, a voice recognition of the human, an activity by the human, or a context associated with the human.

8. The method of claim 7,
    wherein,
        the activity by the human includes at least one of interacting with another human, witnessing an event at the particular site, or interacting with a second object, and
        the second object includes at least one of a communications device, a recording device, or a physical object.

9. The method of claim 7,
    wherein,
        the context associated with the human includes at least one of a first proximity of the human to one or more surrounding objects or a second proximity of the human to one or more surrounding events,
        the one or more surrounding objects includes one or more humans, one or more recording devices, one or more vehicles, or one or more buildings, and
        the one or more surrounding events includes a conversation, an accident, an attack, a physical impact on property, a noise, or a natural disaster.

10. The method of claim 1, further comprising:
    detecting one or more predetermined conditions, the one or more predetermined conditions including at least one of a presence of an object, a characteristic of the object, a camera tampering event, an event, an activity at a particular site, a fire, or a flood;
    determining a risk of damage based on the one or more predetermined conditions; and
    detecting the threat based on the risk of damage.

11. A system comprising:
    one or more processors; and
    at least one computer-readable storage medium having stored therein instructions which, when executed by the one or more processors, cause the system to:
        detect one or more features related to one or more media content items;
        tag the one or more media content items with one or more identifiers based on the one or more features;
        rank the one or more media content items based on the one or more identifiers;
        prior to detecting a threat, select the one or more media content items for a prioritized backup based on the rank, the prioritized backup effective to cause higher ranked data to be backed up before lower ranked data when the threat is detected; and
        when the threat is detected, send the higher ranked data associated with the one or more media content items to a network destination defined for the prioritized backup before sending the lower ranked data, the prioritized backup effective to cause lower-bit rate copies of content to be sent to the network destination defined for the prioritized backup before sending higher-bit rate copies of the content, when the lower-bit copies are available.

12. The system of claim 11,
wherein,
the one or more features include objects, events, or conditions, and
the one or more identifiers include tags identifying at least one of the objects, the events, the conditions, a respective recording time of the one or more media content items, a respective quality of the one or more media content items, or a respective time of capture of the at least one of the objects, the events, or the conditions.

13. The system of claim 12, wherein a selected image extracted from a frame is ranked higher and sent to the network destination defined for the prioritized backup prior to sending the frame.

14. The system of claim 13,
wherein,
the ranking of the one or more media content items is based on the tags, and
the ranking of the one or more media items includes:
increasing a ranking of a respective media content item based on one or more events captured by the respective media content item,
decreasing the ranking of the respective media content item as the time of capture of the respective media content item is farther from a period of time associated with the one or more events,
increasing the ranking of the respective media content item based on one or more objects captured by the respective media content item,
increasing the ranking of the respective media content item based on one or more conditions captured by the respective media content item, or
decreasing the ranking of the respective media content item when the respective quality of the respective media content item is below a threshold.

15. The system of claim 14, wherein the objects, the events or the conditions include at least one of: a human, a physical object, a human emotion, a human gesture, an obstruction of a field of view of a camera, a tampering event, an activity at a particular site, a fire, a flood, or a physical impact to one or more objects.

16. A non-transitory computer-readable storage medium comprising:
instructions stored therein which, when executed by one or more processors, cause a system to:
detect one or more features related to one or more media content items,
tag the one or more media content items with one or more identifiers based on the one or more features,
rank the one or more media content items based on the one or more identifiers,
prior to detecting a threat, select the one or more media content items for a prioritized backup based on the rank, the prioritized backup effective to cause higher ranked data to be backed up before lower ranked data when the threat is detected, and
when the threat is detected, send the higher ranked data associated with the one or more media content items to a network destination defined for the prioritized backup before sending the lower ranked data, the prioritized backup effective to cause lower-bit rate copies of content to be sent to the network destination defined for the prioritized backup before sending higher-bit rate copies of the content, when the lower-bit copies are available.

17. The non-transitory computer-readable storage medium of claim 16,
wherein,
the one or more features include objects, events, or conditions, and
the identifiers include tags identifying at least one of the objects, the events, the conditions, a respective recording time of the one or more media content items, a respective quality of the one or more media content items, or a respective time of capture of the at least one of the objects, the events, or the conditions.

18. The non-transitory computer-readable storage medium of claim 17, wherein a selected image extracted from a frame is ranked higher and sent to the network destination defined for the prioritized backup prior to sending the frame.

19. The non-transitory computer-readable storage medium of claim 18,
wherein,
the ranking of the one or more media content items is based on the tags, and
the ranking of the one or more media items includes:
increasing a ranking of a respective media content item based on one or more events captured by the respective media content item,
decreasing the ranking of the respective media content item as the time of capture of the respective media content item is farther from a period of time associated with the one or more events,
increasing the ranking of the respective media content item based on one or more objects captured by the respective media content item,
increasing the ranking of the respective media content item based on one or more conditions captured by the respective media content item, or
decreasing the ranking of the respective media content item when the respective quality of the respective media content item is below a threshold.

20. The non-transitory computer-readable storage medium of claim 19, wherein the objects, the events or the conditions include at least one of: a human, a physical object, a human emotion, a human gesture, an obstruction of a field of view of a camera, a tampering event, an activity at a particular site, a fire, a flood, or a physical impact to one or more objects.

* * * * *